United States Patent
Mclachlan et al.

(10) Patent No.: US 12,464,311 B2
(45) Date of Patent: Nov. 4, 2025

(54) PRIVATE SHARING OF LOCATION DATA FOR EXTENDED REALITY RENDERING

(71) Applicant: Telefonaktiebolaget LM Ericsson (publ), Stockholm (SE)

(72) Inventors: Paul Mclachlan, San Francisco, CA (US); Héctor Caltenco, Oxie (SE); Sara Thorsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 364 days.

(21) Appl. No.: 18/007,046

(22) PCT Filed: Jul. 27, 2020

(86) PCT No.: PCT/IB2020/057084
§ 371 (c)(1),
(2) Date: Jan. 26, 2023

(87) PCT Pub. No.: WO2022/023788
PCT Pub. Date: Feb. 3, 2022

(65) Prior Publication Data
US 2023/0262412 A1    Aug. 17, 2023

(51) Int. Cl.
*H04W 4/00* (2018.01)
*H04L 67/52* (2022.01)
*H04W 4/02* (2018.01)

(52) U.S. Cl.
CPC ............... *H04W 4/02* (2013.01); *H04L 67/52* (2022.05)

(58) Field of Classification Search
CPC .......... H04W 4/02; H04W 4/50; H04W 4/20; H04L 67/52; H04L 67/131
See application file for complete search history.

(56) References Cited

U.S. PATENT DOCUMENTS 8,200,617 B2   6/2012 Spivack et al.
8,909,648 B2  12/2014 El-Yaniv et al.
(Continued)

FOREIGN PATENT DOCUMENTS

WO   2018/115934 A1   6/2018
WO   2022/023789 A1   2/2022

OTHER PUBLICATIONS

Alina Kloss et al., "Combining Learned and Analytical Models for Predicting Action Effects from Sensory Data," Oct. 12, 2020, 18 pages, downloaded from https://arxiv.org/pdf/1710.04102.
(Continued)

*Primary Examiner* — Md K Talukder
(74) *Attorney, Agent, or Firm* — Nicholson De Vos Webster & Elliott LLP

(57) ABSTRACT

A method of an electronic device in an edge cloud of a mobile network supports extended reality localization of an object having a location in the real world where the location is stored as location information in a database in the mobile network. The method includes receiving a request from an application of a user equipment, the request for location information of an object, the request including an object identifier for the object, retrieving the location information from a database using the object identifier, returning the location information to the application at the user equipment, determining whether the retention requirements for the location information and the object identifier are met, and deleting the location information and the object identifier from the edge cloud and the database in response to determining the retention requirements are not met.

14 Claims, 11 Drawing Sheets

(56) References Cited

U.S. PATENT DOCUMENTS

| | | | |
|---|---|---|---|
| 9,524,434 | B2 | 12/2016 | Gee et al. |
| 9,541,383 | B2 | 1/2017 | Abovitz et al. |
| 9,672,206 | B2 | 6/2017 | Carus et al. |
| 10,075,813 | B1 | 9/2018 | Struhsaker et al. |
| 10,115,232 | B2 | 10/2018 | Miller et al. |
| 10,235,450 | B2 | 3/2019 | Thomas |
| 10,267,924 | B2 | 4/2019 | Ramanandan et al. |
| 10,321,182 | B2 | 6/2019 | Herz |
| 10,424,065 | B2 | 9/2019 | Armeni et al. |
| 10,565,773 | B1 | 2/2020 | Tytgat |
| 11,288,319 | B1 | 3/2022 | Das et al. |
| 2003/0061028 | A1 | 3/2003 | Dey et al. |
| 2003/0233451 | A1 | 12/2003 | Ludvig et al. |
| 2010/0183192 | A1 | 7/2010 | Fritsch et al. |
| 2010/0211649 | A1 | 8/2010 | Dimas et al. |
| 2013/0290234 | A1 | 10/2013 | Harris et al. |
| 2016/0260255 | A1 | 9/2016 | Bean et al. |
| 2016/0314622 | A1 | 10/2016 | Davis et al. |
| 2016/0378861 | A1 | 12/2016 | Eledath et al. |
| 2017/0161546 | A1 | 6/2017 | Cansizoglu et al. |
| 2017/0201585 | A1 | 7/2017 | Doraiswamy et al. |
| 2017/0256071 | A1 | 9/2017 | Laugier et al. |
| 2017/0339099 | A1 | 11/2017 | Levy-Abegnoli et al. |
| 2018/0160330 | A1 | 6/2018 | Frydman et al. |
| 2018/0182475 | A1 | 6/2018 | Cossler et al. |
| 2018/0336732 | A1 | 11/2018 | Schuster |
| 2019/0068461 | A1 | 2/2019 | Barkie et al. |
| 2019/0147220 | A1 | 5/2019 | Mccormac et al. |
| 2019/0204092 | A1 | 7/2019 | Wheeler |
| 2019/0238952 | A1 | 8/2019 | Boskovich |
| 2019/0319868 | A1 | 10/2019 | Svennebring et al. |
| 2019/0339688 | A1 | 11/2019 | Cella et al. |
| 2019/0363951 | A1 | 11/2019 | Vasseur et al. |
| 2019/0368868 | A1 | 12/2019 | Abovitz et al. |
| 2020/0005542 | A1* | 1/2020 | Kocharlakota .... G02B 27/0172 |
| 2020/0026076 | A1 | 1/2020 | Beckman |
| 2020/0069210 | A1 | 3/2020 | Berenzweig et al. |
| 2020/0120446 | A1* | 4/2020 | Stammers ............. H04W 72/04 |
| 2020/0136994 | A1 | 4/2020 | Doshi et al. |
| 2020/0160534 | A1 | 5/2020 | Labbe et al. |
| 2020/0225673 | A1 | 7/2020 | Ebrahimi et al. |
| 2020/0302510 | A1 | 9/2020 | Chachek et al. |
| 2020/0404078 | A1* | 12/2020 | Iyer ........................ H04W 4/021 |
| 2020/0410751 | A1 | 12/2020 | Omari et al. |
| 2021/0099547 | A1* | 4/2021 | Han .................... H04L 67/1023 |
| 2021/0117697 | A1* | 4/2021 | Guim Bernat ....... G08G 1/0133 |
| 2021/0263779 | A1 | 8/2021 | Haghighat et al. |
| 2021/0321413 | A1 | 10/2021 | Shin et al. |
| 2023/0351704 | A1* | 11/2023 | Mclachlan ............. G06V 20/20 |
| 2024/0195789 | A1* | 6/2024 | Doshi ................. H04L 63/0435 |

OTHER PUBLICATIONS

Craig Schlenoff et al., "An approach to predicting the location of moving objects during on-road navigation," 2003, 10 pages, downloaded from https://tsapps.nist.gov/publication/get_pdf.cfm?pub_id=824436.

Dirk Schulz et al., "Probabilistic state estimation of dynamic objects with a moving mobile robot," 2001, pp. 107-115, Robotics and Autonomous Systems 34, downloaded from http://www2.informatik.uni-freiburg.de/~burgard/postscripts/web-editions.

Ericsson ConsumerLab and IndustryLab, "5G Consumer Potential: Busting The Myths Around The Value of 5G For Consumers," May 2019, 16 pages, downloaded from https://www.ericsson.com/498f26/assets/local/reports-papers/consumerlab/reports/2019/5g-consumer-potential-report.pdf.

Ericsson ConsumerLab, "Merged Reality: Understanding How Virtual and Augmented Realities Could Transform Everyday Reality," Jun. 2017, 12 pages, downloaded from https://www.ericsson.com/4a2c58/assets/local/reports-papers/consumerlab/reports/2017/ericsson_consumerlab_merged-reality_report_aw-screen.pdf.

ETSI TS 129 572 V15.1.0, "5G; 5G System; Location Management Services; Stage 3 (3GPP TS 29.572 version 15.1.0 Release 15)," Oct. 2018, 36 pages, ETSI.

Kenneth Research, "Global Extended Reality (XR) Market," Nov. 2019, 3 pages, downloaded from https://www.kennethresearch.com/sample-request-10195901 on Aug. 25, 2020.

Li et al—Statistical Modeling of Complex Backgrounds for Foreground Object Detection—Nov. 2004—IEEE (Year: 2004).

Sekiyama et al—Event_recognition_using_object_motion_context—2010—IEEE (Year: 2010).

Stephan Gammeter et al., "Server-side object recognition and client-side object tracking for mobile augmented reality," 2010, pp. 1-8, Computer Society Conference on Computer Vision and Pattern Recognition—Workshops, IEEE.

Vegard Flovik, "How do you teach physics to machine learning models?," Aug. 23, 2018, 14 pages, Towards Data Science, downloaded from https://towardsdatascience.com/how-do-you-combine-machine-learning-and-physics-based-modeling-3a3545d58ab9.

Wenxiao Zhang et al., "CloudAR: A Cloud-based Framework for Mobile Augmented Reality," May 8, 2018, 13 pages, downloaded from https://arxiv.org/pdf/1805.03060.

Wikipedia, "VR positional tracking," May 10, 2021, pp. 1-10.

Yuebin Yang et al., "Multiple Object Tracking with Kernelized Correlation Filters in Urban Mixed Traffic," 2017, pp. 209-216, 2017 14th Conference on Computer and Robot Vision.

Anonymous, "Extended Reality (XR) Market, 2025, Growth Rate, Industry Size, Share, Trends, Growth Factors," Jan. 10, 2020, 7 pages, MarketWatch.

Cheng—Edge caching and computing in 5G for mobile augmented reality and haptic—2020—Elsevier (Year: 2020).

Zhou et al—Ad Hoc Networks—2007—Springer (Year: 2007).

\* cited by examiner

PRIVATE SHARING OF LOCATION DATA FOR EXTENDED REALITY RENDERING

CROSS-REFERENCE TO RELATED APPLICATIONS

This application is a National stage of International Application No. PCT/IB2020/057084, filed Jul. 27, 2020, which is hereby incorporated by reference.

This application is related to International Application No. PCT/IB2020/057085, titled COMPUTER VISION AND ARTIFICIAL INTELLIGENCE METHOD TO OPTIMIZE OVERLAY PLACEMENT IN EXTENDED REALITY, filed Jul. 27, 2020, which is hereby incorporated by reference.

TECHNICAL FIELD

Embodiments of the invention relate to the field of extended reality rendering; and more specifically, to a system and process for facilitating the sharing of location information in support of extended reality rendering.

BACKGROUND ART

Augmented reality (AR) augments the real world and the physical objects in the real world by overlaying virtual content. This virtual content is often produced digitally and may incorporate sound, graphics, and video. For example, a shopper wearing augmented reality glasses while shopping in a supermarket might see nutritional information for each object as they place it in their shopping cart. The glasses augment reality with information.

Virtual reality (VR) uses digital technology to create an entirely simulated environment. Unlike AR, which augments reality, VR immerses users inside an entirely simulated experience. In a fully VR experience, all visuals and sounds are produced digitally and do not include input from the user's actual physical environment. For example, VR may be integrated into manufacturing where trainees practice building machinery in a virtual reality before starting on the real production line.

Mixed reality (MR) combines elements of both AR and VR. In the same vein as AR, MR environments overlay digital effects on top of the user's physical environment. MR also integrates additional, richer information about the user's physical environment such as depth, dimensionality, and surface textures. In MR environments, the end user experience more closely resembles the real world. As an example, consider two users hitting a MR tennis ball on a real-world tennis court. MR incorporates information about the hardness of the surface (grass versus clay), the direction and force the racket struck the ball, and the players' height. Augmented reality and mixed reality are often used to refer to the same idea. As used herein, "augmented reality" also refers to mixed reality.

Extended reality (XR) is an umbrella term referring to all real-and-virtual combined environments, such as AR, VR and MR. XR refers to a wide variety and vast number of levels in the reality-virtuality continuum of the perceived environment, consolidating AR, VR, MR and other types of environments (e.g., augmented virtuality, mediated reality, etc.) under one term.

An XR device is the device used as an interface for the user to perceive both virtual and/or real content in the context of extended reality. An XR device typically has a display that may be opaque and displays both the environment (real or virtual) and virtual content together (i.e., video see-through) or overlay virtual content through a semi-transparent display (optical see-through). The XR device may acquire information about the environment through the use of sensors (typically cameras and inertial sensors) to map the environment while simultaneously tracking the device's location within the environment.

Object recognition in extended reality is mostly used to detect real world objects and for triggering the digital content. For example, the consumer would look at a fashion magazine with augmented reality glasses and a video of a catwalk event would play in a video instantly. Note that sound, smell, and touch are also considered objects subject to object recognition. For example, a diaper ad could be displayed as the sound and perhaps when the mood of a crying baby is detected. Mood could be deducted from machine learning applied to sound data.

SUMMARY

In one embodiment, a method of an electronic device in an edge cloud of a mobile network supports extended reality localization of an object having a location in the real world where the location is stored as location information in a database in the mobile network. The method includes receiving a request from an application of a user equipment, the request for location information of an object, the request including an object identifier for the object, retrieving the location information from a database using the object identifier, returning the location information to the application at the user equipment, determining whether the retention requirements for the location information and the object identifier are met, and deleting the location information and the object identifier from the edge cloud and the database in response to determining the retention requirements are not met.

In another embodiment, a method of an electronic device in communication with an edge cloud of a mobile network supports the electronic device to participate in an extended reality localization of an object associated with the electronic device, the object having a location in the real world. The method includes generating a unique object identifier for the object, determining location information for the object and retention limits for the location information, and reporting the location information for the object to the edge cloud with the retention limits.

In a further embodiment, an electronic device in an edge cloud of a mobile network supports extended reality localization of an object having a location in the real world where the location is stored as location information in a database in the mobile network. The electronic device includes a non-transitory machine-readable medium having stored therein an extended reality localization service, and a processor coupled to the non-transitory machine-readable medium. The processor executes the extended reality localization service. The extended reality localization service receives a request from an application of a user equipment, the request for location information of an object, the request including an object identifier for the object, retrieves the location information from a database using the object identifier, returns the location information to the application at the user equipment, determines whether the retention requirements for the location information and the object identifier are met, and deletes the location information and the object identifier from the edge cloud and the database in response to determining the retention requirements are not met.

In one embodiment, an electronic device in communication with an edge cloud of a mobile network participates in an extended reality localization of an object associated with the electronic device, the object having a location in the real world. The electronic device includes a non-transitory machine-readable medium having stored therein a localization service, and a processor coupled to the non-transitory machine readable medium. The processor executes the localization service. The localization service generates a unique object identifier for the object, determines location information for the object and retention limits for the location information, and reports the location information for the object to the edge cloud with the retention limits.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1A:
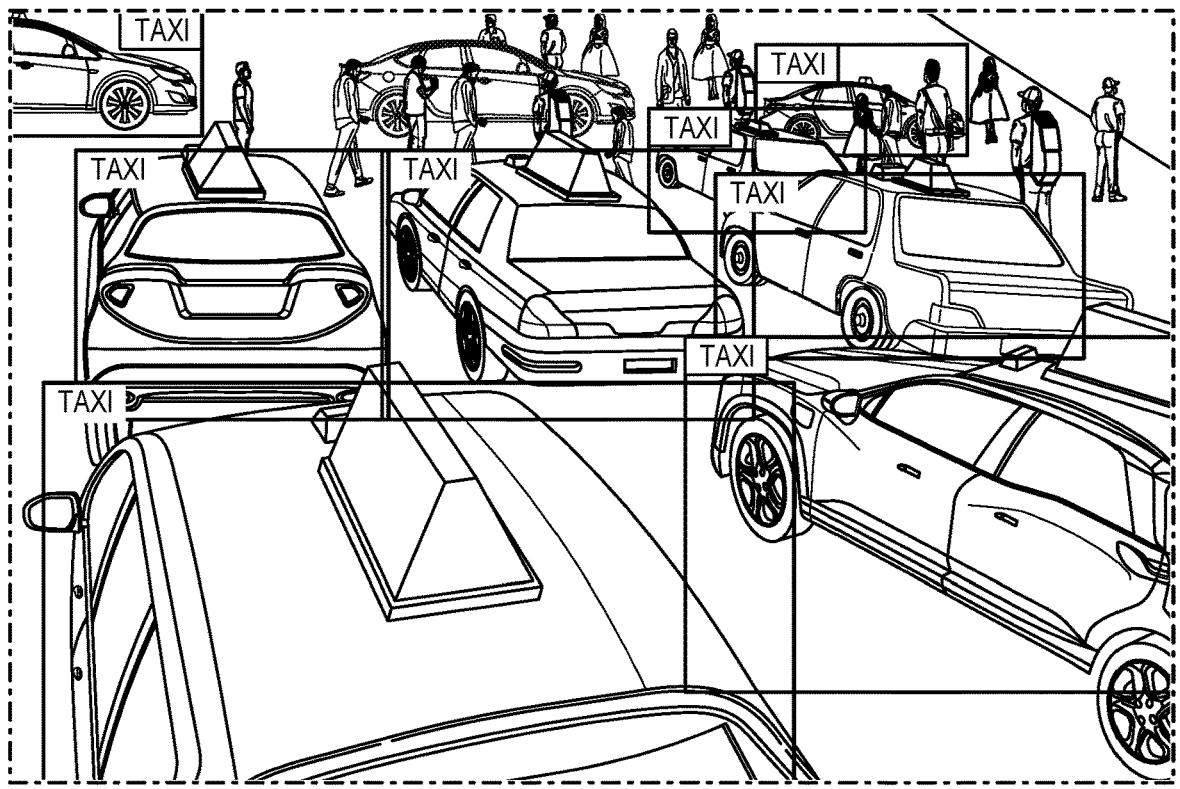
FIG. 1A is a diagram of one embodiment of an example user interface of a display of a user equipment.

The following description describes methods and apparatus for sharing location data in support of extended reality rendering. In particular, the methods and apparatus describe a system and processes whereby objects can manage the sharing of location data with user equipment that are rendering extended reality where an edge cloud is facilitating the sharing of the location data. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user equipment). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The embodiments provide an architecture and set of processes for electronic devices functioning as Internet-of-Things (IoT) devices to share location information across a network to improve the rendering of an extended reality (XR) overlay by applications executed by user equipment where the IoT devices and user equipment are connected with an edge cloud and associated resources. The system and processes guarantee data privacy and control to the electronic devices that are sharing location information. The users of the electronic devices that are sharing location information can specify the duration for which the shared location information can be retained by the edge cloud and associated resources or similarly limit the access and retention of the location information at the edge cloud. The embodiments also enable the sharing of the location information by electronic devices connected to an edge cloud and related services. The embodiments utilize an object identifier, referred to herein as an ObjectID, to identify electronic devices and associated objects that are sharing location information.

Augmented Reality (AR), Virtual Reality (VR), and Extended Reality (XR), are critically important use cases for 5G New Radio (NR). 5G NR solves several technical problems that previously hindered XR's widespread adoption. As used herein, XR is considered to encompass AR and any combination of real world environments and virtualized overlay or graphics. Superimposing graphics over the real world environment requires extensive and rapid processing of image, position, and location data to semantically understand and spatially map the end user's physical environment. Prior to the advent of 5G NR and similar emerging technologies utilized in mobile networks, the latency was too high in earlier mobile network technology generations to process the XR related data in external edge and/or cloud (hereinafter, "edge cloud") environments. User equipment that implement XR applications (e.g., headsets, goggles, glasses, and similar user equipment) were designed to integrate significant compute power, resulting in user equipment for XR that were physically bulky and cumbersome. With its extremely low latency, 5G NR and similar mobile network technologies enable product designers to move computing resources away from the physical user equipment and into the edge cloud, resulting in more streamlined physical forms, lower latencies, and enhanced quality of user experience for XR experiences. The 5G NR and similar mobile network technology's speed allows more data to be sent and received every second, supporting higher framerates, enhanced resolutions, and larger audio/video datasets. This will allow developers to create more natural and immersive experiences in XR.

Figure 1B:
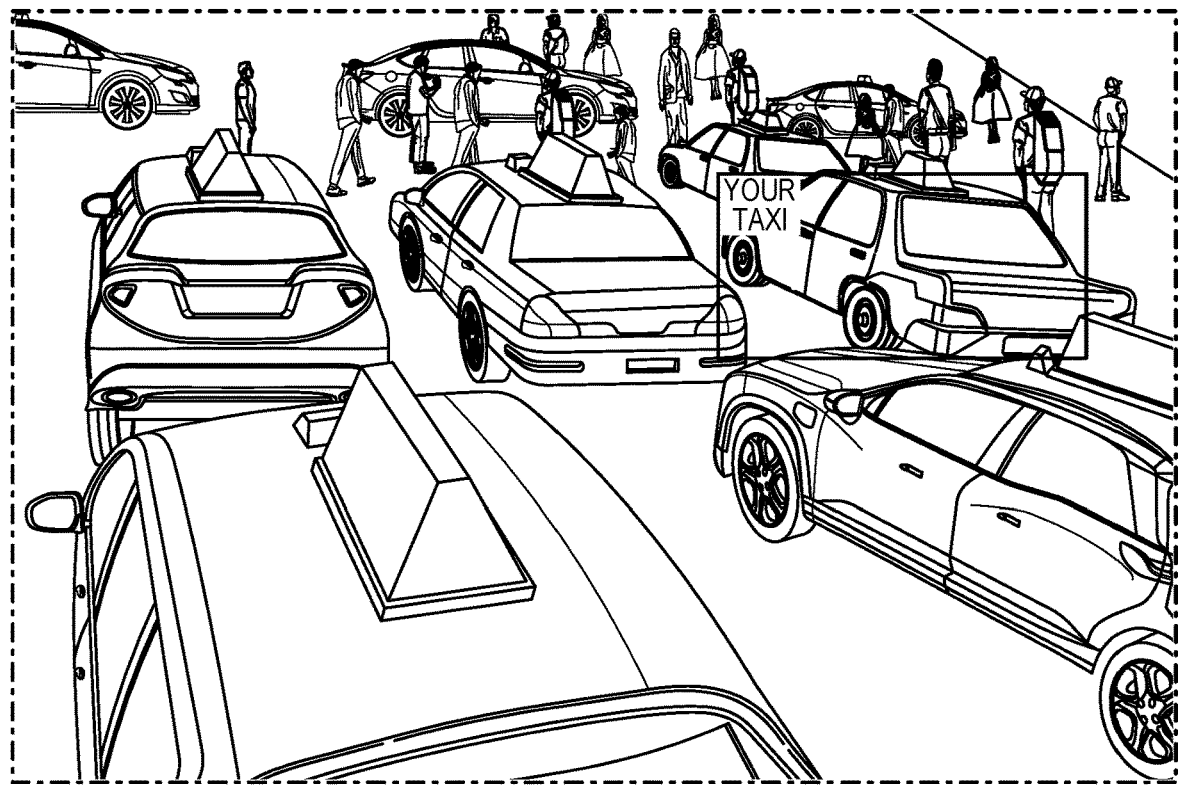
FIG. 1B is a diagram of one embodiment of another example user interface of a display of a user equipment.

It is expected that consumers will widely adopt XR applications once 5G NR and related technologies are widely deployed. Many of the use cases predicted for XR, however, are not currently feasible with current mobile network technology. This is because displaying content in XR presents numerous challenges not found in other media; physical space and the motion of objects are critical differences between displaying content in XR and other media. An example is illustrated in FIGS. 1A and 1B. In this example case, end users having a user equipment executing an XR application wish to be guided via the XR application to a specific taxicab that has been assigned to the user nearby. Semantic understanding applications use computer vision to detect objects within a scene. In this example, computer vision (i.e., a set of camera inputs into the user equipment and image recognition software) is able to identify all the taxicabs in the end user's field of vision. However, as object detection algorithms are designed to detect all objects of a similar type within a scene, current implementations cannot identify a specific object from other visually similar objects, unless specifically trained to do so, e.g., a fingerprint or face identification applications. FIG. 1A shows this problem in a real-world setting where all of the visually similar yellow taxis appear identical to the XR application. In this case the XR application is attempting to overlay an identifier, a box labeled 'taxi.' Unfortunately, the XR application cannot visually distinguish between the many yellow taxis causing all of them to have an overlay attached to them. This end result is not useful to the user of the XR application, because the user needs to identify the specific yellow taxi that has been assigned to the user.

Solving this problem is difficult and the current art is not able to solve the problem, in particular, in a manner that takes into account both motion of the object being identified, and the privacy requests of the object being identified. The embodiments utilize spatially defined mappings of the real world in the form of cubes of space that are defined to correlate to the real world via a set of three dimensionally defined coordinates. In some embodiments, the geospatial units are referred to as 'ad units' that are defined by geospatial coordinates and are static. Each of these units or cubes can be associated with real world objects as well as virtual objects including advertisements. The embodiments overcome the limitations and deficiencies of the prior art to provide support for successful implementations of XR applications that enables the user equipment and XR applications to identify objects paired with the end user as that object moves through real-world and virtual space. The system and process receive and store location information that is provided by electronic devices associated with real world objects (e.g., IoT devices) and manage the retention of the location information according to the limits defined by the respective electronic device that provides the location information. In some embodiments, the system and processes operate to receive location information from the sharing electronic devices that push their current latitude and longitude to the edge cloud and related resources to facilitate rendering by XR applications, which exposes those objects' location information to the XR applications. The edge cloud monitors the limitations of the location information specified by the objects that provide the location information to enforce these limitations. The embodiments utilize a temporary identifier for objects that share location information, referred to as an Object identifier (ObjectID). The XR applications can utilize any method of process, including artificial intelligence or machine-based learning processes, to utilize the location information provided by the embodiments.

In some embodiments, the eligibility of an object for a unique visual overlay by the XR application might depend on the capability of the visual object to get detected by an object detector or to contain enough visual features to be identified and located by computer vision. Any process of visually detecting objects can be utilized including any type of image recognition, artificial intelligence, machine learning or similar process. The embodiments provide a mobile network based architecture that associates precise location information with the ObjectID. To protect the privacy of data associated with the electronic devices sharing location information, the administrator or user of the electronic device can specify how long the edge cloud or associated resource retains data specific to the ObjectID. Subsequently, once an XR application and user equipment is paired with an object, the XR application generates a temporally defined Request Identifier (RequestID). These RequestIDs allow the XR application and user equipment to access information contained within the edge cloud by an ObjectID. To protect privacy, once the time limit for a RequestID is exceeded, the user equipment is no longer able to access any data associated with the ObjectID. All data for each ObjectID are deleted in accordance with specified limitations and preferences of the sharing electronic device, ensuring full privacy.

FIG. 1B is a diagram of one embodiment of an example XR interface where like objects have been distinguished. In the embodiments, the like objects, for example the yellow taxis, can be differentiated using location information provided by an electronic device associated with the yellow taxi. The yellow taxi that has been assigned to a user shares its location information via the ObjectID and RequestID pairing system. The XR application of a user equipment that views the numerous yellow taxis can correctly overlay and identify the specific taxi that is assigned to the user by matching it with the location information of the taxi. Thus, the illustrated view of an XR rendering of an XR application can identify a single specific taxi that a user of the XR application can then know is the yellow taxi that has been assigned to that user, for example, via a ride calling or sharing application paired with the XR application.

The embodiments address a number of specific deficiencies in the art to enable the private sharing of location information for XR rendering. The embodiments provide the ability for mobile network-connected devices to generate ObjectIDs and subsequently store them in the resources associated with the edge cloud. The embodiments provide the ability for devices to use 5G NR, Wi-Fi, or other generations of mobile networks to associate data with their assigned ObjectIDs in real-time. The embodiments provide the ability for electronic devices executing XR application or other types of electronic devices to generate a RequestID and store these in the edge cloud and associated resources. The embodiments provide the capability for all data associated with each ObjectID and RequestID to be purged from the edge cloud and associated resources, protecting end user and device privacy. The embodiments provide the ability for devices executing XR applications to use mobile network data for object detection between visually similar objects.

The embodiments provide a new implementation and architecture that benefits from the next generation of low latency and high-speed networks (e.g. 5G NR and/or Wi-Fi) to localize physical items (hereinafter, "objects") within a defined space in real-time. These physical items, i.e., objects, are associated with electronic devices capable of communicating with a mobile network to share information with other electronic devices connected to the mobile network. For example, a taxi can either have an embedded device or can associate with a mobile handset device of a driver. 'Objects' as discussed herein encompass both the physical object, e.g., a taxi, and the associated electronic device that enables its connectivity with the mobile network.

The embodiments use localization (i.e., sharing of location information) to make it possible using computer vision for an electronic device executing an XR application to distinguish among visually similar objects. In particular, the embodiments provide real-time generalized object localization that is essential to support many of XR's most commercially and socially important use cases. For instance, without location information, XR applications are unable to distinguish between otherwise visually identical cars, tools in factories, or industrial equipment. The embodiments avoid localization related problems. For example, requiring objects to share their location data in a centralized database can cause issues. This centralized storage of location information is less than ideal for multiple reasons. Gathering objects' location information into a centralized database has significant implications for privacy, particularly as data ages or expires. If such location information is collected in real time or near real time, anyone with access to such a database can surveil citizens' movement as well as any devices associated with them. Centralized databases, especially those stored in remote cloud servers, could be too slow to enable real time use cases. For some low-latency demanding applications, the value of location information for XR spatial mapping via simultaneous localization and mapping (SLAM) algorithms is dependent on knowing where a given object is located within a few milliseconds of latency, not seconds or minutes of latency. Centralized databases might have varying data quality, throwing their utility for localization into question. Centralized databases can also be turned into walled gardens, preventing open access, and network neutrality.

The embodiments avoid such issues by utilizing an architecture that incorporates differential privacy to allow objects to share their real-time location information without it being stored for longer than is strictly necessary. The embodiments benefit from the low latency and high speed of new generation networks (e.g. 5G NR and/or Wi-Fi) to share location data into an edge cloud environment in mobile networks. These mobile networks with edge cloud resources have low latency, which serves as an advantage in at least two dimensions. First, low network latency allows objects to share location data to XR devices to access it in real time. Second, using data in real time allows for the data to be stored only temporarily without sacrificing model quality. Temporary storage of location information and the concordant privacy is not provided in the art, which store and rely upon vast amounts of historical data.

In some embodiments, the architecture utilizes a global shared real world mapping system. The real world mapping system can divide the real world into two or three dimensional spaces. In one embodiment, a cubic 1-meter grid over the surface of the planet is determined and each cubic meter is assigned a unique alphanumeric identifier referred to as a Cube Identifier (a CubeID). However, in other embodiments, any size, shape, or configuration of a real-world mapping can be utilized. The example of a cubic representation is described herein by way of example and not limitation.

Similarly, the use of CubeIDs are described herein as a mechanism to locate objects, however, one skilled in the art would understand that the principles, processes, and structures described herein are fully compatible with other demarcations of location such as latitude, longitude, and altitude. The CubeID is one type of location identifier (referred to as a LocID), which uniquely identifies a location (e.g., a cube) within a spatial mapping system that is correlated with the real world. Any type of location identifier can be used with the embodiments; the example of the CubeID is used herein by way of example and not limitation. Within the edge cloud, each object is assigned an alphanumeric ObjectID that uniquely identifies it. Each object then uploads its location and other data into the edge cloud, in response to changes in that data, at regular intervals, or in response to other events. In some embodiments, to improve efficiency, all location information is matched to the closest CubeID. This data is retained for the length of time specified by the data retention preferences. Data retention preferences are a set of rules or limitations that define the duration or circumstances for data retention and/or deletion. A user or administrator of each electronic device or application that is associated with an object or that makes use of the XR rendering support features can define data retention preferences. When an XR application on an electronic device attempts to access location or other information stored within the edge cloud, it generates a RequestID and uploads it into the edge cloud. The RequestID is then matched to the ObjectID within the edge cloud, granting the XR application temporary access to the data stored for each paired ObjectID. Finally, once the time limit specified in the RequestID is exceeded, the edge cloud breaks the link between the RequestID of the XR application and the ObjectID and deletes associated data, protecting end user and device privacy.

The embodiments provide advantages to managing advertising in XR rendered space. Global digital advertising is a huge multi-billion dollar industry that is growing rapidly. It is anticipated that XR space will become a potential advertising space as well. Technological limitations are a key reason for XR being a small market currently. XR content is prohibitively expensive to create and requires specialized creative agencies. 4G Long Term Evolution (LTE) and earlier mobile networks technologies were too slow to handle XR content's large file size seamlessly. 4G LTE and earlier mobile network technology latencies are too slow to process the necessary information in real-time, yielding buggy end user experiences in XR. As mentioned, 5G NR and similar technologies are anticipated to address the latency and bandwidth issues hampering the widespread use of XR applications and technologies.

The embodiments, support XR by improving the localization of visually similar objects, in a manner that supports differential privacy (i.e., differing retention policies or preferences for each object). Offering an architecture that enables a way to consume and use XR media without exposing some of the most private and sensitive data is an advantage over the art that can be applied to make the architecture of the embodiments desirable for users and thereby build a large user base that can attract advertisers. The embodiments provide processes to localize objects in real time for XR purposes using the low latency of new generation networks, such as 5G NR, to facilitate objects (e.g., Internet of Things (IoT)) sharing their location information in real time. The embodiments use the high bandwidth of new generation networks, such as 5G NR, to facilitate the localization of fast paced moving objects to update their location information in real time, and to facilitate computer vision models distinguishing between similar objects of the same class by using network location information to differentiate between like objects.

The embodiments, store location information using differential privacy such that data is only retained and shared according to end user preferences specified in data retention preferences. In some embodiments, a unique identifier is assigned to each request for access to data retained within the edge cloud or associated resources such that access is revoked once the transaction completes. The embodiments can measure physical location in three dimensions such that overlay graphics can be correctly rendered on the user equipment by an XR application. The embodiments can purge data from the edge cloud such that no data with implications for privacy are retained longer than necessary or in accordance with data retention preferences.

The embodiments have an architecture with the further advantages of speed, scalability, flexibility, and context. Speed is provided by use of 5G NR or similar technologies in combination with the edge cloud resources, which allows objects (e.g., IoT objects) to share location information in real time. The architecture is scalable since it is cloud- and edge-ready. The architecture is flexible since any type of mobile network connected device can upload location information. By incorporating location data information into spatial mapping and rendering, the embodiments facilitate customized XR experiences for each end user. In some embodiments, by incorporating all three dimensions (height, width, and depth) into measurement of location, the embodiments support three-dimensional rendering in XR.

The embodiments can utilize spatial mapping techniques to spatially map physical locations and automatically identify the set of all possible locations (CubeIDs). In particular, the embodiments provide processes and an architecture through which mobile network-connected devices (i.e., objects) can share real-time location data with differential privacy support for the purposes of accurately rendering XR content and overlays.

Prior to any data being exchanged across the mobile network to support XR applications, the architecture defines and maps a set of CubeIDs to the real world. The granularity of the mapping can vary by design of the architecture and can encompass a mapping of an entire planet or any smaller area. In the example embodiments, a 1 cubic meter (1 m$^3$) grid around the globe is defined. The example of a cube (1 m$^3$) based approach correlates with the location awareness standards contained within the 3$^{rd}$ Generation Partnership Project (3GPP) 5G NR standards. This system enables mobile networks to be able to place connected objects within a meter. Each 1 m$^3$ cube is assigned a unique alphanumerical identifier called a Cube Identifier (CubeID).

The height of the cubes can vary up to a maximum altitude range in a geographic area. The height of the area defined can be specified for different applications or operators. For example, in some places a CubeID grid could cover one- or three-meters height, while other places might require higher altitudes to be covered.

Figure 2A:
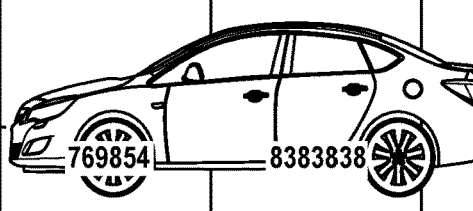
FIG. 2A is a diagram of one embodiment of a cube space including a vehicle and drone that have assigned object identifiers.
Figure 2B:
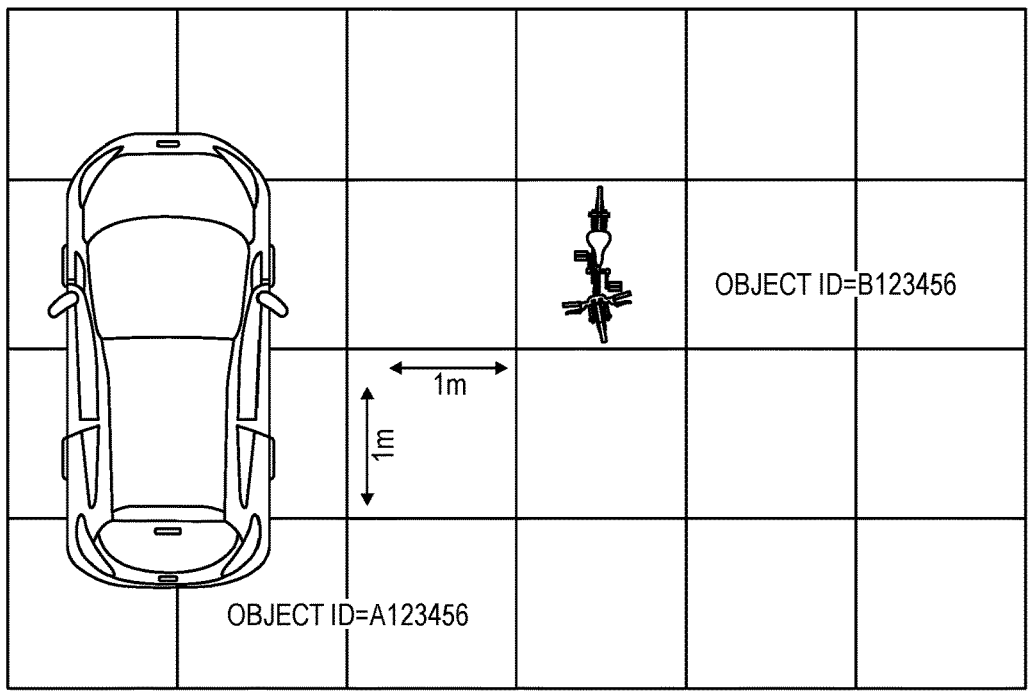
FIG. 2B is a diagram of one embodiment of a cube space including a vehicle and bicycle that have assigned object identifiers.

FIGS. 2A and 2B are examples of the application of the cube grid. FIG. 2A is an example of the cube grid from a side perspective, while FIG. 2B is an example of the cube grid from the top down perspective. As shown in FIG. 2A, each cube is assigned an alphanumeric code. The alphanumeric codes are the unique CubeID assigned to identify that specific three-dimensional cube. Any process or system can be used for the initial association and defining of the grid and association with the real world.

With the mapping of the cube grid or similar virtual map to the real world set, the initialization process can create and assign to every object enrolled in the XR localization service of the edge cloud database for XR display purposes a unique alphanumeric ObjectID. In some embodiments, the ObjectID is a discrete predefined data structure. Each ObjectID can contain encoded information about the object, such as the original manufacturer; its object type (vehicle, equipment, infrastructure, advertisement), the maximum duration (e.g., in hours) its data may be retained in the edge cloud; a checksum; and similar information that is encoded as alphanumeric data such that the totality of the ObjectID information is unique. An example of an ObjectID is shown below in Table I:

TABLE I

| ABCDEFG | 001 | 000001 | ABC1234567 | 0001 | 0001 |
|---|---|---|---|---|---|
| Company | Use Code | 6 Digit Prefix | Object Type | Time Limit (e.g., in hours) | Checksum |

The example ObjectID includes a first field (e.g., seven characters) that uniquely identify the object manufacturer or owner, the use code can indicate an object class or other broad category, the six-digit prefix code is used to identify the specific device or object relative to other devices or objects of the same type and owner/manufacturer, the object type can identify a specific class, category, or type of object, the time limit (e.g., in hours) is the amount of time this data structure can be retained by other devices (e.g., in a database of the edge cloud), and the checksum is used to validate the ObjectID. In this case, the resulting ObjectID is ABCDEFG001000001 ABC123456700010001. In this example, the ObjectID would be deleted by the edge cloud resources after an hour from the point of its reception. In other embodiments, other data, data sizes, and formats can be utilized such that an object can be uniquely identified, and a retention policy or preferences can be associated with the object. The additional data can include timestamps of creation, receipt, or similar information for tracking and enforcing retention. The additional data can include other retention preferences, such as logic or rules identifying conditions upon which the ObjectID is to be deleted or can continue to be retained (e.g., a number of accesses or resolution of a specific transaction).

Any process can be utilized to register or enroll a given object as eligible for XR localization service. The objects can establish communication with the XR localization service hosted at the edge cloud, authenticate with the XR localization service, and send ObjectIDs and similar information to the XR localization service using any combination of communication protocol or services. An object can register or enroll with the XR localization service upon connection with the XR localization service. Registration or enrollment does not necessitate storing location information with the XR localization service.

The embodiments enable users or administrators associated with objects to direct that the object's ObjectID be reset or regenerated. Resetting or regenerating the ObjectID will permanently sever the link between an object and any data incidentally retained anywhere in the edge cloud or network. Any process or protocol can be utilized to reset or regenerate an ObjectID by an object. The object can also reregister or re-enroll with the XR localization service at any time.

Returning to FIG. 2A, the example cube grid is shown from a side perspective where a car and a drone are within the cube grid. In this example, each object transmits a current CubeID of the cube or cubes in which it exists in real time to the XR localization service. The example shows a horizontal view, meaning the objects also extend into a third dimension (depth) that is not shown. In the example, the drone is wholly positioned within the cube with CubeID 5738239. The car overlaps a set of cubes. The car can either transmit the CubeID of each of the cubes in a defined order that indicates the disposition of the car in the cube space or can transmit the CubeID of a single cube or a subset of the cubes in which the associated electronic device is disposed. In other embodiments, other organizations, and combinations of the CubeIDs for larger objects can be utilized to convey different levels of positional information. In addition to the CubeIDs, other positional information can be provided, including orientation, speed, state information (e.g., whether the lights of a taxi are on), and similar information that can be relevant to identifying or localizing the object in the XR rendering.

FIG. 2B is a diagram of another example spatial mapping of the cube space that includes a car and a bicycle. In this example, the car (assigned ObjectID A123456) and bike (ObjectID B123456) are shown in the three-dimensional cube space. In the architecture of the embodiments, each object transmits the CubeIDs in which it exists in real time. This figure shows a bird's eye view, meaning the objects extend into a third dimension (height) that is not shown here. In some embodiments, the objects can transmit their ObjectID along with CubeIDs to associate the location information with the object. In other embodiments, the objects maintain a communication session with the XR location service such that messages with updated CubeIDs can be associated with the object at the edge cloud.

Figure 3:
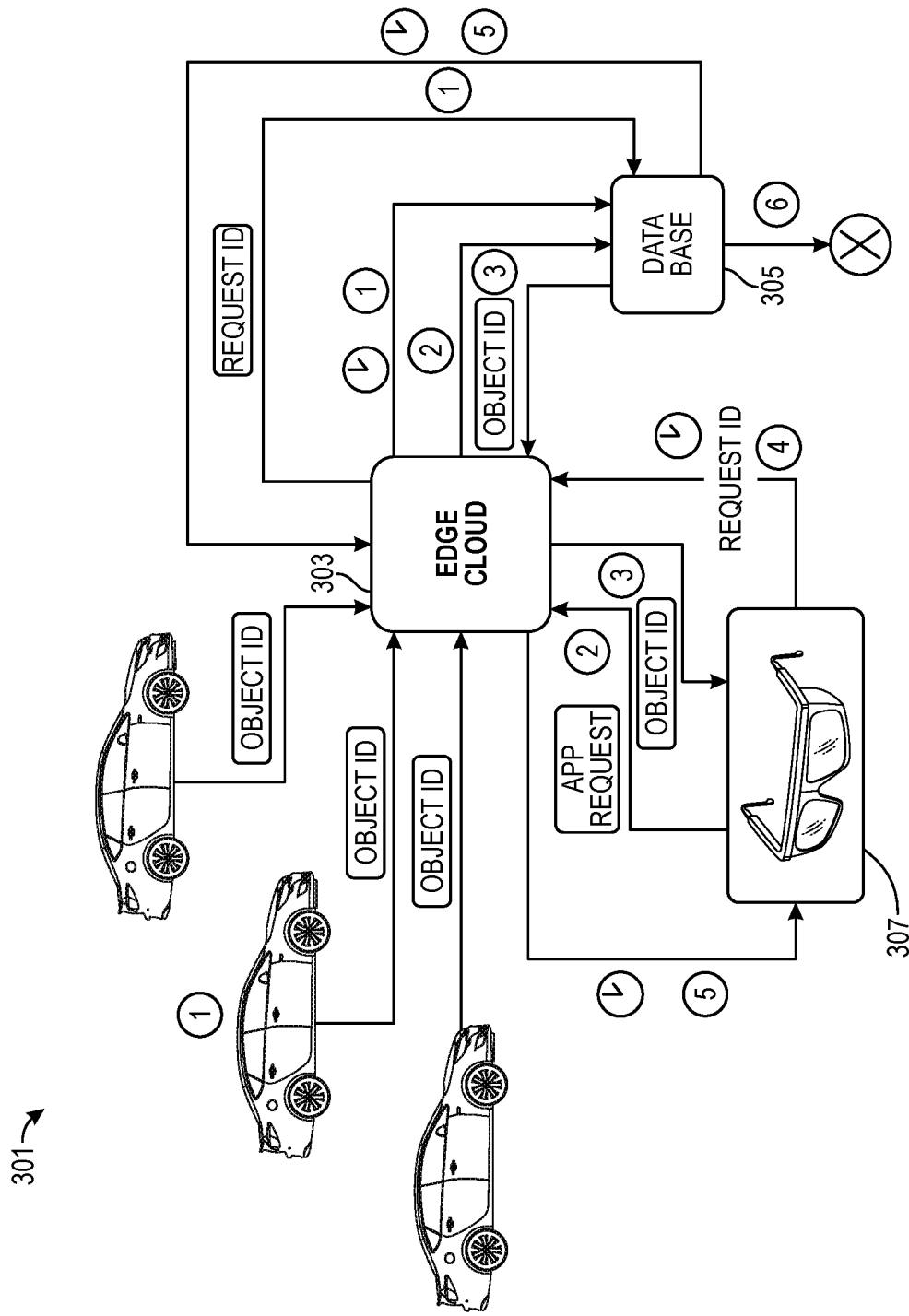
FIG. 3 is a diagram of one embodiment of an architecture to track reported object information and enable sharing of location data for extended reality.

FIG. 3 is a diagram of one embodiment of the architecture of the edge cloud based XR localization service. The architecture is invoked once an object 301 that is assigned an ObjectID starts broadcasting its location information. The ObjectID can be assigned, generated, reset, or regenerated by the object 301, by the edge cloud 303, or a resource (e.g., database system 305) associated with the edge cloud. In the examples discussed herein, the ObjectID is generated by the object 301. In some embodiments, the objects 301 can share their location data at varying times. Objects 301 can share location information at any frequency. For example, objects can share location information responsive to changes in location, at fixed intervals, continuously, or any variation or combination thereof. Instead, users or administrators associated with the objects 301 can set the frequency and in some case can manually toggle location sharing on and off (e.g., via a graphical user interface (GUI) on the device or an application associated with the electronic device of the object). Once enabled, location data can be sent as a message, reported, streamed, pushed/pulled, or similarly transmitted via 5G NR, Wi-Fi, or technologies of earlier mobile network generations to the nearest edge cloud environment 303. The location information can be shared using any protocol or format. In one example embodiment, location information is shared in the form of an array containing the ObjectID, location (either as latitude, longitude, and altitude or CubeID), and any other fields that may be required to share additional information.

The location data arrays are processed in the edge cloud 303 and retained in a database 305. If location data is shared in a raw format (e.g. latitude and longitude), these datapoints are assigned to their nearest CubeID and the raw data are purged. The edge cloud 303 is a set of electronic devices and resources positioned in proximity to base stations, cells, towers, or similar transmission component in the radio access network (RAN) of the 5G NR mobile network, similar mobile network technologies, earlier mobile network technologies and any combination therewith. The edge cloud services and devices are administered by a mobile network operator (MNO) or similar entity. For sake of clarity and conciseness, the edge cloud 303 services and devices are represented as a single point of contact in the illustration. However, the edge cloud 303 services and devices are distributed over a wide area of a mobile network. Transitioning between connected edge cloud devices as an object moves through the area of coverage of the mobile network is transparent for purposes of the XR localization service and is handled by the handover process of the mobile network.

Similarly, the database system 305 in which ObjectID and location information are stored can be co-located with edge cloud devices or resources or can have a low latency connection with the edge cloud devices or resources. The database system 305 can have any format or organization such as an associative or object oriented database system or other type of database system that is capable of storing and associating ObjectIDs with the appropriate location information as it is reported by the objects to the edge cloud 303. The database can be distributed over any number of locations and devices to ensure a low latency availability to the XR localization services of the edge cloud 303.

The architecture of the embodiments enables applications, websites, and other services and tools to integrate the location information retained in the edge cloud database and utilize in their operations. Applications can be executed on any electronic device (e.g., on an XR device 307) that use the mobile network to transmit requests for location information about objects to servers controlled by the MNO or the application or jointly administered with the application. In some embodiments, the applications (e.g., XR applications) running on an XR device 307 operate in conjunction with services and functions (e.g., servers) that execute in the edge cloud such that these services and functions are provided by any combination of the developer of the application, which are deployed to the edge cloud, and services and functions provided by the MNO, for example as part of XR localization services. The XR localization services, as used herein, refer to any combination of MNO and developer functions and services deployed to the edge cloud 303. An XR device 307, as used herein, refers to any electronic device that is utilized to render XR via a display, haptic feedback or other output device and which can include cameras, sensors, positional devices, or other input devices to collect information about the real world around the electronic device.

The XR applications (e.g., at an XR device 307) can access a specific ObjectID by use of a matchmaking process. An XR application or related services or functions can send a RequestID that identifies the XR application or associated XR device to the XR localization service, which includes a matchmaking or similar service or in other embodiments the matchmaking process or service is separate from the XR localization service. After the matchmaking process, the ObjectIDs for the matching set of objects will be returned to the XR device 307 via the XR location services of the mobile network. The RequestID and the ObjectID will also be paired in the database 305 or the XR localization service at the edge cloud 303. The matchmaking process can use any process to correlate RequestIDs and ObjectIDs. These matchmaking processes can be XR application specific and can rely on authentication or security protocols of related applications and services. For example, if an XR application on the XR device 307 is connected with a taxing hailing application, then the XR application can coordinate with the taxi hailing application, the taxi hailing servers and services associated with the taxi hailing application, and the matchmaking service to match an ObjectID of a taxi that is being dispatched to a user of the XR device 307 such that the XR application can utilize the location information of the ObjectID of the assigned taxi to locate and overlay information about that taxi when it comes into the field of view of the user of the XR device 307.

Once the RequestID of the XR application is paired with a set of ObjectIDs, the XR application and device 307 can then request access to the location information for the object associated with the ObjectID that is stored at the edge cloud 303 and/or database 305 to enable the XR application to correctly render graphics related to the object when it is nearby or within a field of view. This request for the location information is communicated in any form, format, or message type and can utilize any communication protocol. The request for the location information can include the RequestID of the XR application and/or XR device 307. Each RequestID can include specific fields including information about the application requesting the data, as well as, the ObjectID, the billing type for data transfers, the time limit (e.g., in hours) for data retention, a checksum, and similar data. An example of the format of the RequestID is shown below in Table II.

TABLE II

| ABCDEFG | 001 | 000001 | ABC1234567 | 0002 | 0001 |
|---|---|---|---|---|---|
| Application | Billing Type | 6 Digit Prefix | ObjectID | Time Limit | Checksum |

In the example RequestID, the first field (e.g., seven characters) uniquely identifies the application associated with or that generated the RequestID, the billing type indicates who pays for the data transfers, the six digit prefix can differentiate between requests for the same ObjectID, provide a filler, or similarly differentiate RequestIDs such that each is unique, the ObjectID uniquely identifies the object whose data is to be accessed, the time limit (e.g., in hours) is the amount of time the data related to the RequestID can be retained in a database or at the edge cloud, and the checksum is used to validate the RequestID. In this example, the resulting RequestID is ABCDEFG001000001ABC123456700020001, which uniquely identifies the requesting application. All data retained in the edge cloud 303 related to this Request ID, and the ability of the XR application and/or device 307 to access data in the edge cloud related to this RequestID are purged after the specified time period expires. Other information or formats can be used for RequestIDs. The format described herein above is provided by way of example and illustration and not limitation. Other fields and information can be included, and other types of data structures can be used to organize this data.

Further to the prior example above, where an end user requests a taxi using a taxi hailing application installed on their XR device 307, a request by the user for a taxi is processed as normal with the taxi hailing application for mobile devices. The taxi hailing application generates a request for a taxi that contains information about the passenger's origin and destination, price, and similar information. The request can be responsive to a user input and information provided by the user of the taxi hailing application. Once the tax hailing application or associated services assigns a taxi to the user, the tax hailing service provides the ObjectID to the taxi hailing application, which can then be shared with the XR application of the XR device. The XR device then generates a RequestID to access the location information stored in the edge cloud 303 or database 305. The RequestID specifies the ObjectID, which enables the XR localization services of the edge cloud 303 and the database 305 to retrieve the location information associated with the ObjectID. The location information is then used as a feature for rendering purposes, enabling the XR device 307 to display relevant information about the object for the end user of the XR application.

XR applications and devices 307 lose access to data retained within the edge cloud 303 or database 305 in response to certain events. The XR application and device 307 can report that they no longer require access to the ObjectID to the XR localization services of the edge cloud 303. In one type of event, the XR application that had requested access to location information of an object can designate an associated transaction as complete. This can occur in response to direct user action or an action of the XR application detecting a completed transaction. For example, a user reaching the yellow taxi and starting a ride can trigger the end of the taxi hailing application transaction with respect to XR rendering. Another type of event can be a termination of the XR application or a disconnect of the XR device 307 that has requested access to the information. When the communication session with the XR application or device 307 terminates, the XR localization services at the edge cloud can detect the disconnect and after a timeout period can end the access of the XR application or device 307. Another event can be a time limit associated with the RequestID or ObjectID being exceeded. For example, if a RequestID has a two-hour time limit, then when the XR localization service or similar service detects the expiration, the RequestID is marked as invalid and access to the edge cloud 303 and database 305 is lost. Similarly, if a requested ObjectID has an expired time limit, then the ObjectID location information will be deleted from the edge cloud 303 and database 305.

Whatever the triggering event, once the XR application or device 307 no longer needs access to data associated with the ObjectID, its access is revoked, and all copies of the underlying data stored on the XR device or cached on the edge cloud 303 are deleted by the XR application and XR localization services, respectively. Data related to the RequestID and ObjectID can be deleted in a manner that is consistent with local data retention laws.

In the diagram of FIG. 3, the flow of data is shown in six stages. In the first stage, there is a flow of ObjectIDs from connected objects that are registered or enrolled with the XR localization services at the edge cloud 303. In the example, a fleet of vehicles are the objects that are sending ObjectIDs to the edge cloud 303. The location information associated with the ObjectIDs is stored at the edge cloud 303 and at the connected database 305. In the second stage, an XR application on the XR device 307 sends a request to the XR localization services or application specific services at the edge cloud 303 and/or database 305 for matchmaking to be paired with an object. The resulting pair from the XR localization services or application specific services are recorded at the edge cloud 303 and/or database 305 and the ObjectID of the matching object is then sent back to the XR device 307 and the XR application in the third stage.

In a fourth stage, the XR device 307 sends a time delimited RequestID to the XR localization services at the edge cloud 303. In response to the RequestID, which includes an ObjectID of an object for which location information is requested, the location information is retrieved from the database 305 and is sent to the XR localization services at the edge cloud 303. In the fifth state, the location information for the object is returned by the XR localization service to the XR device 307. Once the time limit for the RequestID expires, the XR localization service purges information related to the XR device, XR application, and the request from the database 305 and/or edge cloud 303, in the sixth stage. Similarly, if the time limit for the ObjectID expires, the location data and other data associated with the ObjectID are purged from the edge cloud 303 and the database 305.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 4A:
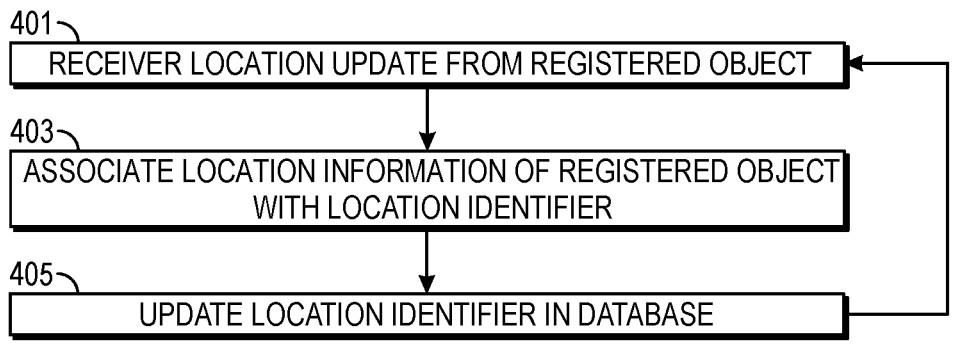
FIG. 4A is a flowchart of one embodiment of a process of an electronic device in the edge cloud to receive location information.

FIG. 4A is a flowchart of one embodiment of a process of an electronic device in the edge cloud to receive location information. The electronic device can be any device capable of executing the illustrated process. In some embodiments, the process is part of the XR localization services executed by the electronic device in the edge cloud. This process can be triggered in response to receiving location information from an object registered or enrolled with the XR localization services (Block 401). The object can transmit an ObjectID along with location information such as a CubeID or other geospatial identification information (e.g., longitude, latitude, altitude, or similar information). Where a CubeID is not provided, the process can correlate the received geospatial identification information with a CubeID or set of CubeIDs (Block 403). Any mapping or processing technique can be used to correlate the provided geospatial identification information with a CubeID. Once the set of CubeIDs is determined or confirmed, the location information stored for the ObjectID of the reporting object is updated to include the CubeID information (Block 405).

In some embodiments, only the most recent location information is stored and maintained. In other embodiments, a history of the CubeID information and other location information is maintained consistent with time limits specified for the ObjectID. In addition to a CubeID, any other location information provided for the ObjectID can be stored and maintained including position, orientation, speed, and similar information about the state of the object. This process can be continuous based on the frequency of the reporting by the object. The communication can be via a communication session or via any communication protocol. In some embodiments the XR localization services can send acknowledgements or other confirmations of the receipt and update of the location information of the object. The location information can be cached at the edge cloud and stored in a database. In some embodiments, the XR localization services can query the object for updated localization information.

Figure 4B:
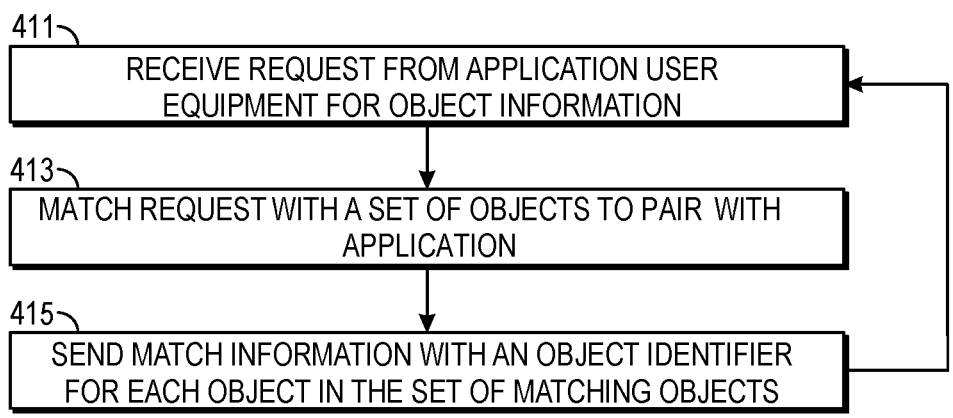
FIG. 4B is a flowchart of one embodiment of a process of an electronic device in the edge cloud to pair user equipment applications with objects.

FIG. 4B is a flowchart of one embodiment of a process of an electronic device in the edge cloud to pair user equipment applications with objects. The electronic device can be any device capable of executing the illustrated process. In some embodiments, the process is part of the XR localization services executed by the electronic device in the edge cloud. In other embodiments, this process can be part of XR application support services or similar services at the edge cloud. This process can be triggered in response to receiving a request from an XR application executing on an XR device or similar source (Block 411). The request is for object matching, in particular objects that may have been identified to the XR application through other sources. The request can include a RequestID of the XR application or device and/or an ObjectID of the target object. The process implements a matchmaking process to pair the requesting device with a set of objects that match the request (Block 413).

Any matchmaking or object pairing process can be utilized and these processes can be specific to the type of the requesting XR application. The matched objects can be paired with the RequestID of the requesting XR application or device or similar pairs such that the pairing indicates approval for the requesting XR application or device to access information about the object from the edge cloud or database. The process can send matching information including the set of ObjectIDs for each matching object to the requesting XR application or device (Block 415).

Figure 4C:
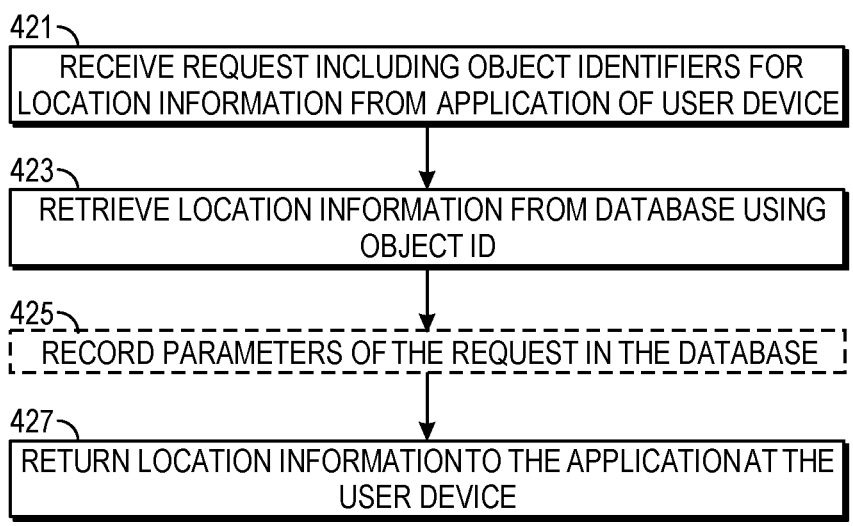
FIG. 4C is a flowchart of one embodiment of a process of an electronic device in the edge cloud to service requests for location data.

FIG. 4C is a flowchart of one embodiment of a process of an electronic device in the edge cloud to service requests for location data. The electronic device can be any device capable of executing the illustrated process. In some embodiments, the process is part of the XR localization services executed by the electronic device in the edge cloud. This process can be triggered in response to receiving a request for location information from an XR application or device (Block 421). The request can be in the form of a RequestID or similar request that includes the ObjectID of an object for which location information is sought. Using the ObjectID, a lookup can be performed for the current location information for the object in cached data at the edge cloud or in the database in an attempt to retrieve this data (Block 423). In some embodiments, parameters and similar information related to the request can be recorded such as time limits and other constraints related to the RequestID and the requesting XR application and/or device (Block 425). This information can be cached at the edge cloud or stored in the database.

The retrieved location information, e.g., CubeID or similar location information, can be returned to the requesting XR application or device (Block 427). The location information can be returned via any communication process or protocol.

Figure 4D:
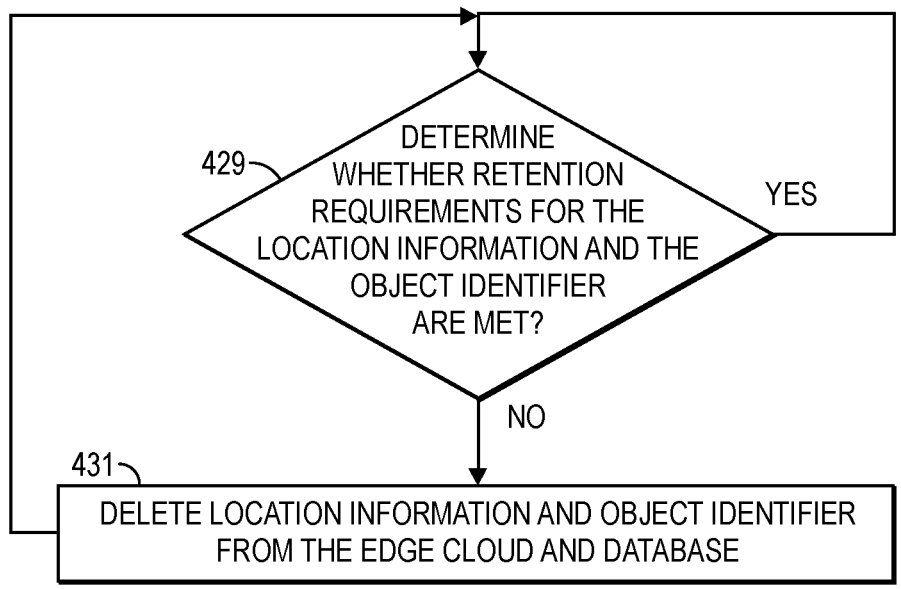
FIG. 4D is a flowchart of one embodiment of a process of an electronic device in the edge cloud to manage location data retention.

FIG. 4D is a flowchart of one embodiment of a process of an electronic device in the edge cloud to manage location data retention. The electronic device can be any device capable of executing the illustrated process. In some embodiments, the process is part of the XR localization services executed by the electronic device in the edge cloud. This process can be triggered in response to a timer or similar time tracking aspect of the electronic device, where the XR localization services can determine whether the retention requirements for location information and the object identifier are met (Block 429). This can include a check for the expiration of each of the timers of RequestIDs or ObjectIDs that are cached at the edge cloud or stored in the database. In addition to time limits, any other retention requirements can be periodically checked to ensure that all of the retention requirements are being met, such as whether the associated transactions have completed, communication session disconnects, or similar events. The process continues to perform periodic retention requirement checks until detection of an event that triggers a data purge. In response to determining that retention requirements are not met (i.e., detecting an event that triggers a data purge of the associated RequestID or ObjectID, the 'NO' arm of the illustrated determination, the process deletes the location information and/or object identifier, e.g., the respective RequestID or ObjectID, and any information stored that is specific to those data structures in accordance with the data retention policies of the XR localization services and any applicable privacy or data security laws (Block 431). This includes deleting this data from both the edge cloud and the database. In some embodiments, a verification is received that the location information and object identifier were purged from the edge cloud and/or database after the retention limits are not met.

Figure 5:
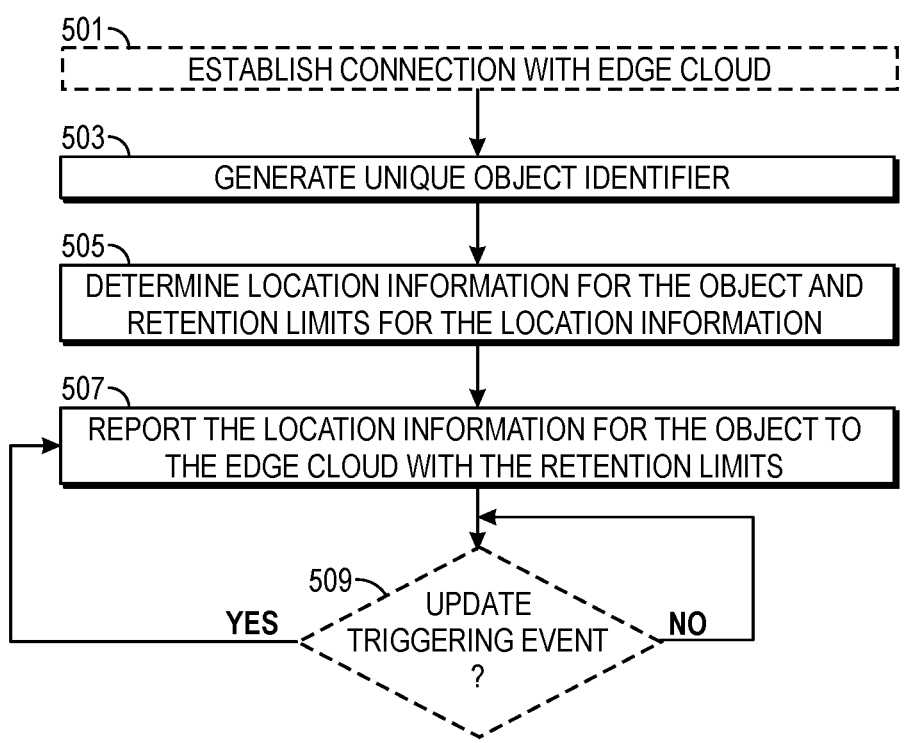
FIG. 5 is a flowchart of one embodiment of a process of an electronic device of an associated object that reports location data to the edge cloud.

FIG. 5 is a flowchart of one embodiment of a process of an electronic device of an associated object that reports location data to the edge cloud. The electronic device can be any device capable of executing the illustrated process. In some embodiments, the process is part of the software executed by the electronic device associated with a given object that is connected to the edge cloud via a mobile network. The software implementing the process can be a localization service that interfaces with the extended reality localization service at the edge cloud. This process can be triggered in response to initialization or connection of the electronic device of an associated object with a mobile network and the XR localization services of the edge cloud of the mobile network. The process can establish a communication session or similar connection with the XR localization service or similar services of the edge cloud (Block 501). The electronic device can generate a unique object identifier (e.g., an ObjectID) for the associated object using any format (e.g., such that the ObjectID uniquely identifies the object in the XR localization service) (Block 503).

The generation of the unique object identifier (e.g., the ObjectID) can include determining associated metadata and information (Block 505). This metadata or related information can include location information, configuration of update frequency, retention limits for location data of the object and similar information. The location information can include location information that can be obtained from local sensors and similar resources associated with the object. A report can be generated and sent to the XR location services including the unique object identifier (e.g., ObjectID), location information about the object, relevant metadata such as retention limits, and similar information, which is sent to the XR localization services (Block 507). If the information provided to the XR localization is updated due to events at the object (e.g., a movement in position, elapse of time, or similar events)(Block 509), then the updated location information, metadata (e.g., retention limits) and similar information can be sent in a new updated report to the XR localization services (Block 507). This process can continue at any frequency set by the data retention preferences of the object, a user, or administrator.

Figure 6:
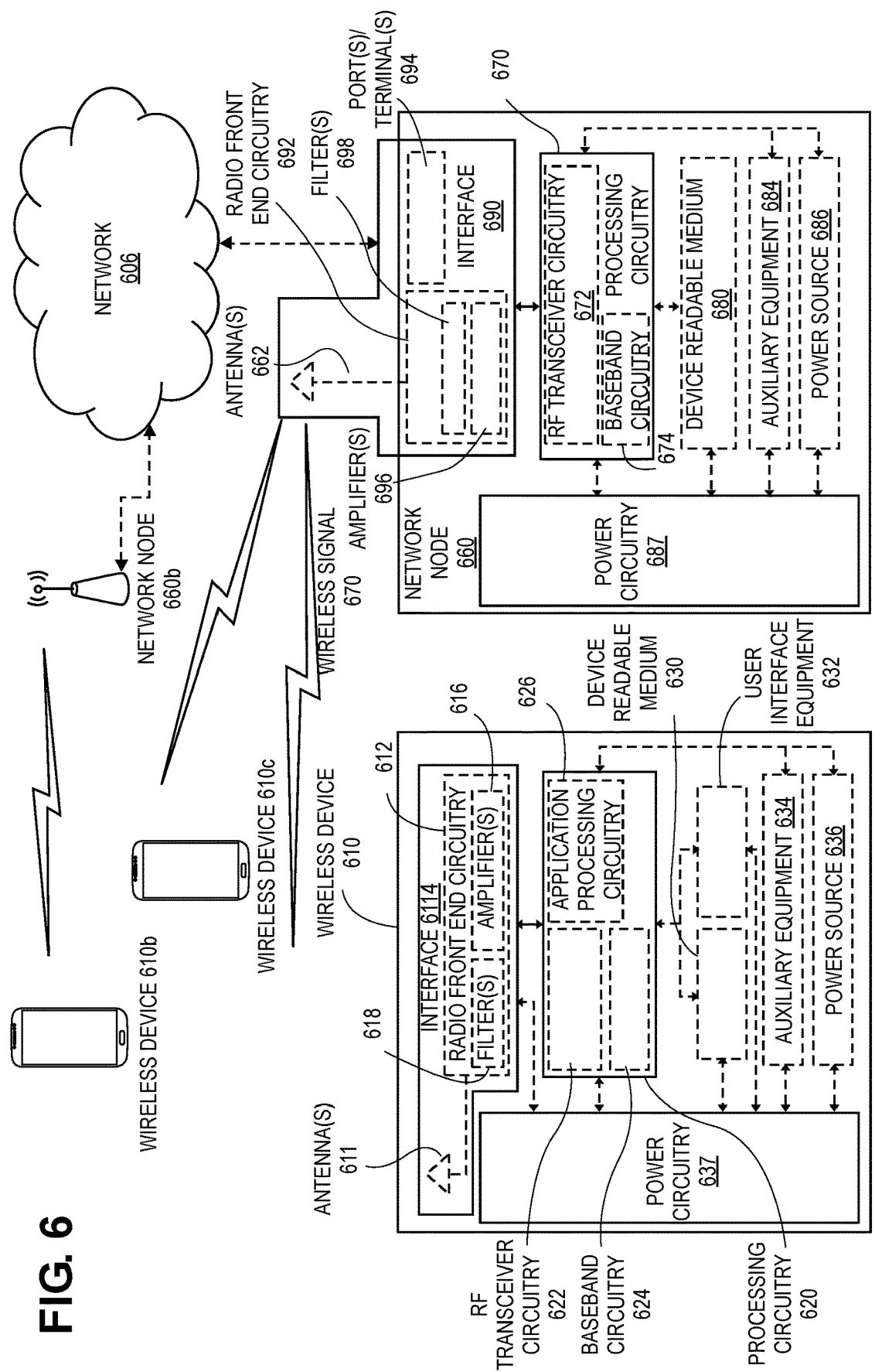
FIG. 6 is a diagram of one example embodiment of a wireless network in which the embodiments can be implemented.

FIG. 6 is a diagram of a wireless network in accordance with some embodiments. Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660b, and WDs 610, 610b, and 610c. In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network, or other similar type of system.

In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMAX), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and an RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, Wi-Fi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part, or all of RF transceiver circuitry 672 and baseband processing circuitry 674 may be on the same chip or set of chips, boards, or units.

In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660 but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signaling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all, or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node, and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node, and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, Wi-Fi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send, and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620 and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some, or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part, or all of baseband processing circuitry 624 and application processing circuitry 626 may be combined into one chip or set of chips, and RF transceiver circuitry 622 may be on a separate chip or set of chips. In still alternative embodiments, part, or all of RF transceiver circuitry 622 and baseband processing circuitry 624 may be on the same chip or set of chips, and application processing circuitry 626 may be on a separate chip or set of chips. In yet other alternative embodiments, part, or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices, and circuits. User interface equipment 632 is configured to allow input of information into WD 610 and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
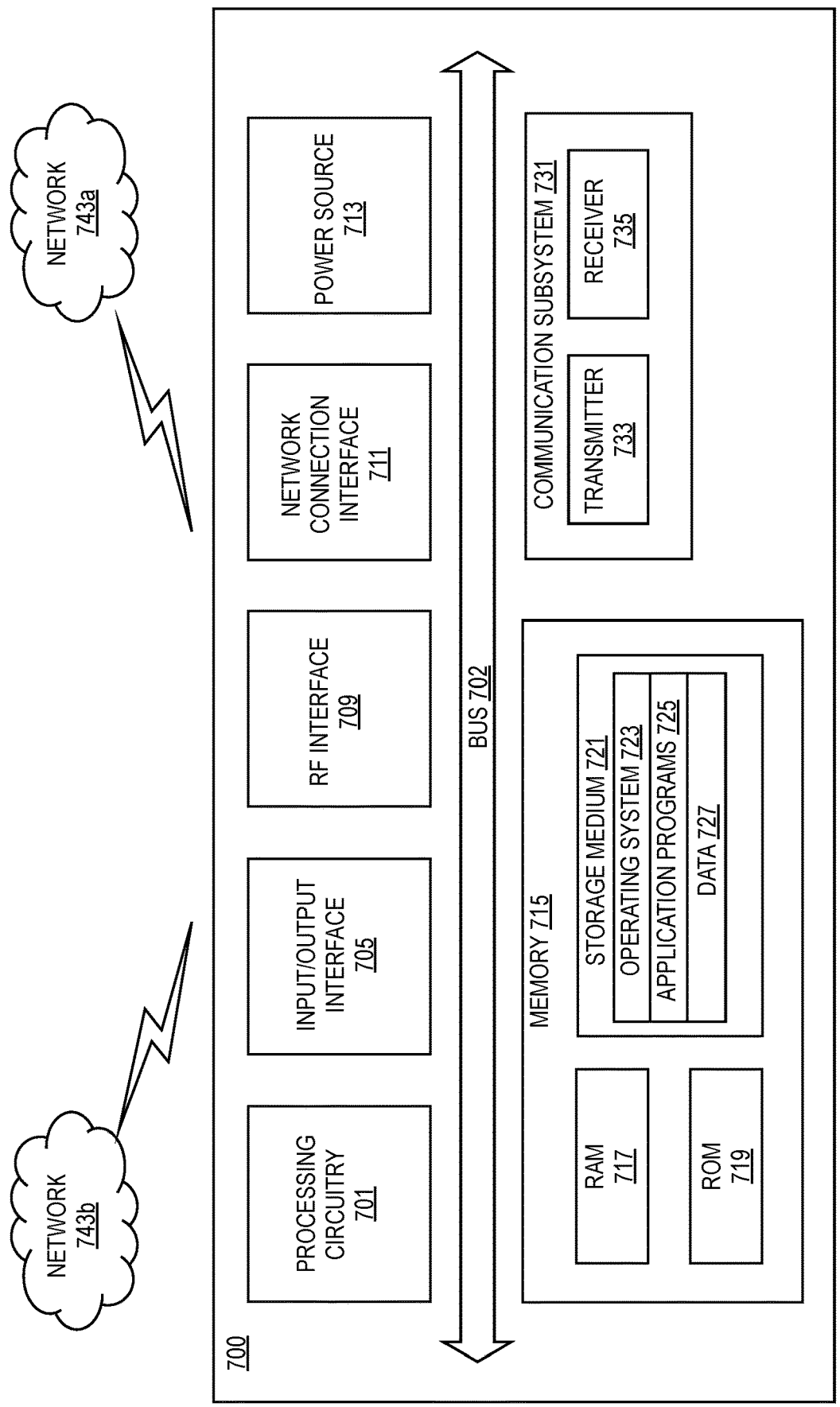
FIG. 7 is a diagram of one example embodiment of an electronic device in which the embodiments can be executed.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 7200 may be any UE identified by the $3^{rd}$ Generation Partnership Project (3GPP), including a NB-IoT UE, a machine type communication (MTC) UE, and/or an enhanced MTC (eMTC) UE. UE 700, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743a. Network 743a may encompass wired and/or wireless networks such as a local-area network (LAN), a wide-area network (WAN), a computer network, a wireless network, a telecommunications network, another like network or any combination thereof. For example, network 743a may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software, or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743b using communication subsystem 731. Network 743a and network 743b may be the same network or networks or different network or networks. Communication subsystem 731 may be configured to include one or more transceivers used to communicate with network 743b. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMAX, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software, or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743b may encompass wired and/or wireless networks such as a local-area network (LAN), a wide-area network (WAN), a computer network, a wireless network, a telecommunications network, another like network or any combination thereof. For example, network 743b may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software, or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
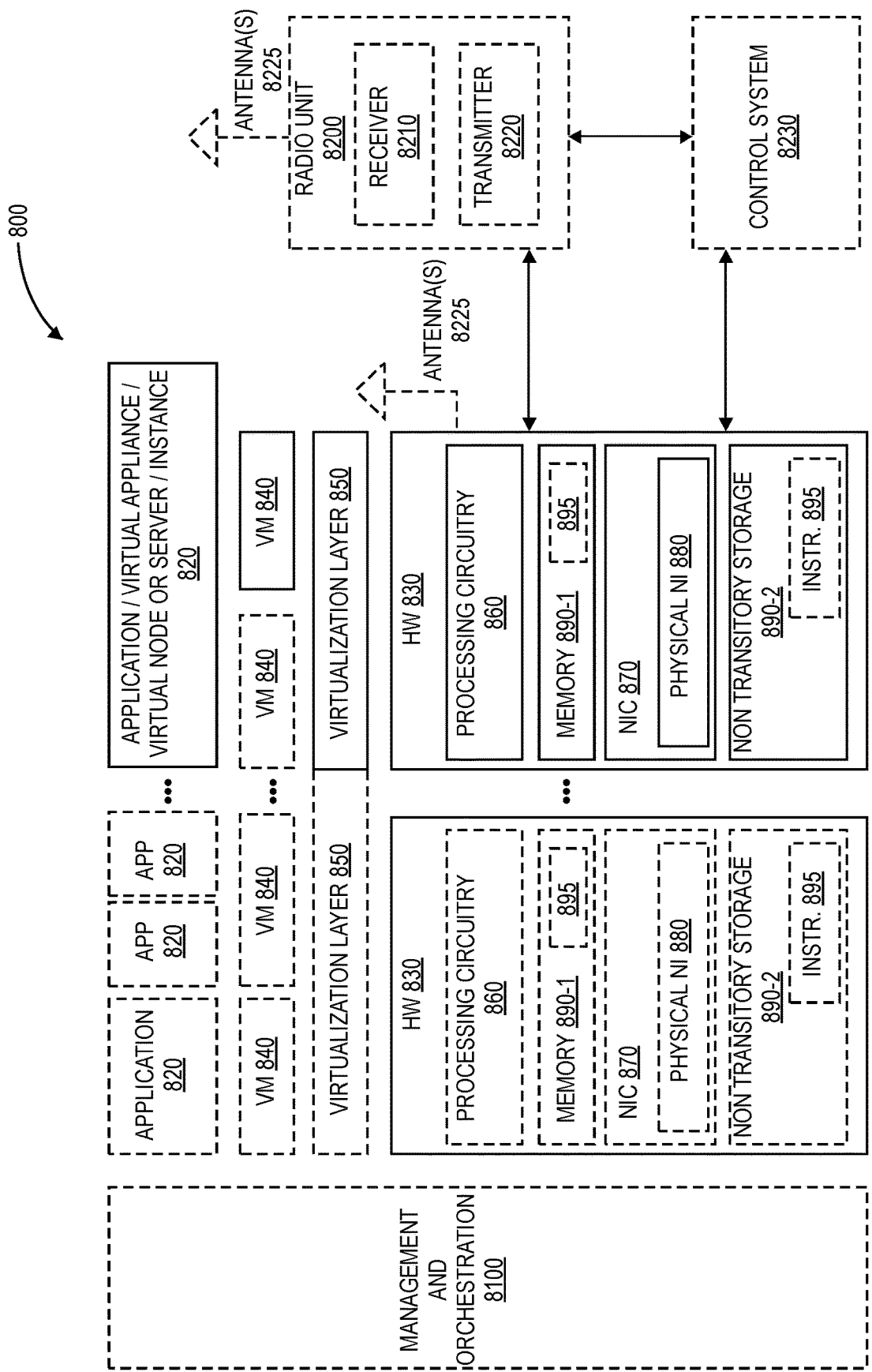
FIG. 8 is a diagram of one example embodiment of a virtualization environment in which the embodiments can be executed.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signaling can be affected with the use of control system 8230 which may alternatively be used for communication between the hardware nodes 830 and radio units 8200.

Figure 9A:
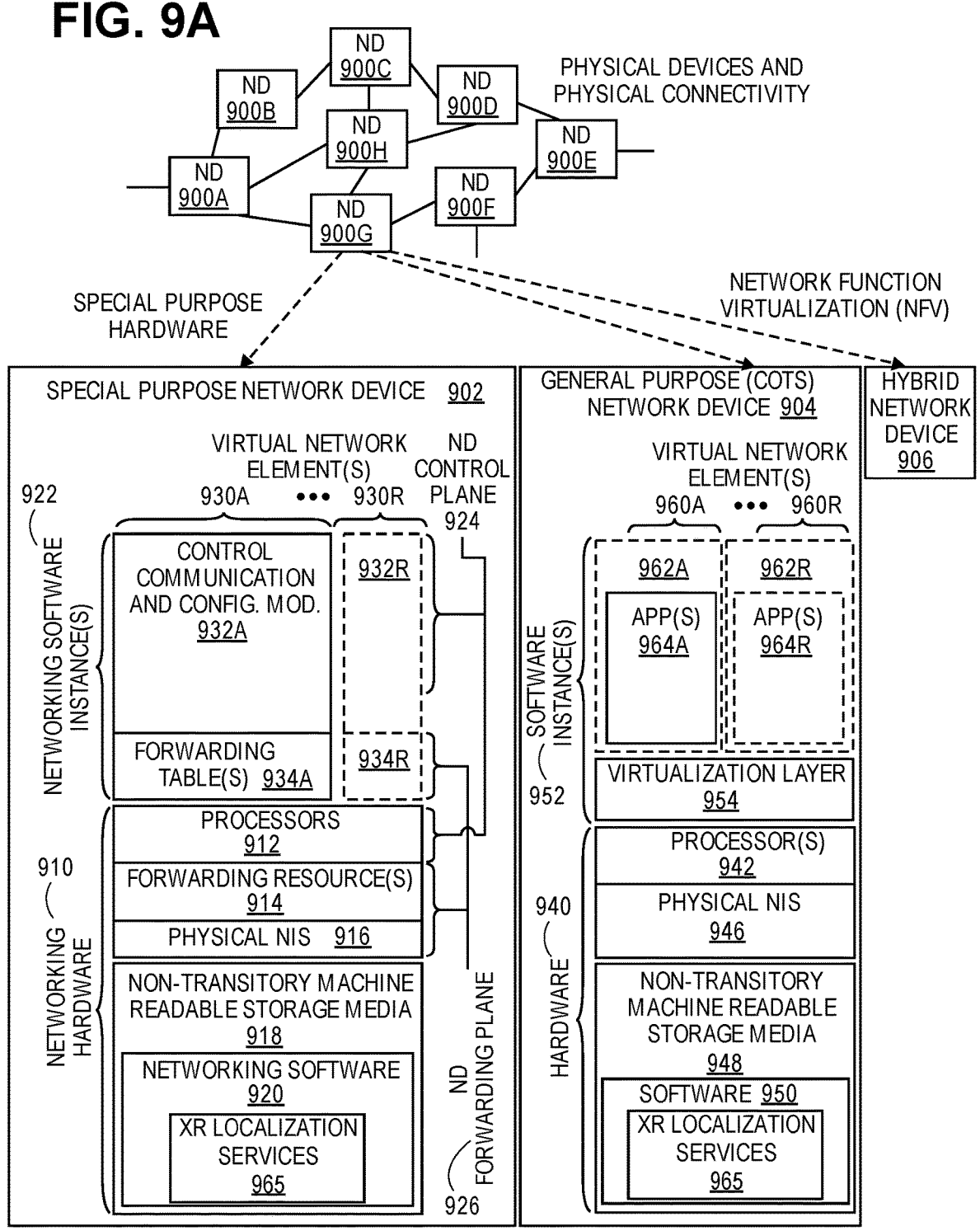
FIG. 9A illustrates connectivity between network devices (NDs) within an exemplary network, as well as three exemplary implementations of the NDs, according to some embodiments of the invention.

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between 900A-900B, 900B-900C, 900C-900D, 900D-900E, 900E-900F, 900F-900G, and 900A-900G, as well as between 900H and each of 900A, 900C, 900D, and 900G. These NDs are physical devices, and the connectivity between these NDs can be wireless or wired (often referred to as a link). An additional line extending from NDs 900A, 900E, and 900F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application-specific integrated-circuits (ASICs) and a special-purpose operating system (OS); and 2) a general purpose network device 904 that uses common off-the-shelf (COTS) processors and a standard OS.

The special-purpose network device 902 includes networking hardware 910 comprising a set of one or more processor(s) 912, forwarding resource(s) 914 (which typically include one or more ASICs and/or network processors), and physical network interfaces (NIs) 916 (through which network connections are made, such as those shown by the connectivity between NDs 900A-H), as well as non-transitory machine readable storage media 918 having stored therein networking software 920. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A). In some embodiments, the networking software 920 can encompass elements and functions of the XR localization services 965 to be executed by the network device 902 according to the embodiments described herein.

The special-purpose network device 902 is often physically and/or logically considered to include: 1) a ND control plane 924 (sometimes referred to as a control plane) comprising the processor(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the processor(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

Figure 9B:
FIG. 9B illustrates an exemplary way to implement a special-purpose network device according to some embodiments of the invention.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and physical NIs 946, as well as non-transitory machine readable storage media 948 having stored therein software 950. During operation, the processor(s) 942 execute the software 950 to instantiate one or more sets of one or more applications 964A-R. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R is run on top of a guest operating system within an instance 962A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers).

The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual network element(s) 960A-R. In some embodiments, the software 950 can encompass elements and functions of the XR localization services 965 to be executed by the general purpose device 904 according to the embodiments described herein. The XR localization service 965 can be executed amongst the applications 965A-R.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 962A-R to VNEs also apply to embodiments where such a finer level of granularity and/or unikernels are used.

In certain embodiments, the virtualization layer 954 includes a virtual switch that provides similar forwarding services as a physical Ethernet switch. Specifically, this virtual switch forwards traffic between instances 962A-R and the physical NI(s) 946, as well as optionally between the instances 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9A is a hybrid network device 906, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 9C:
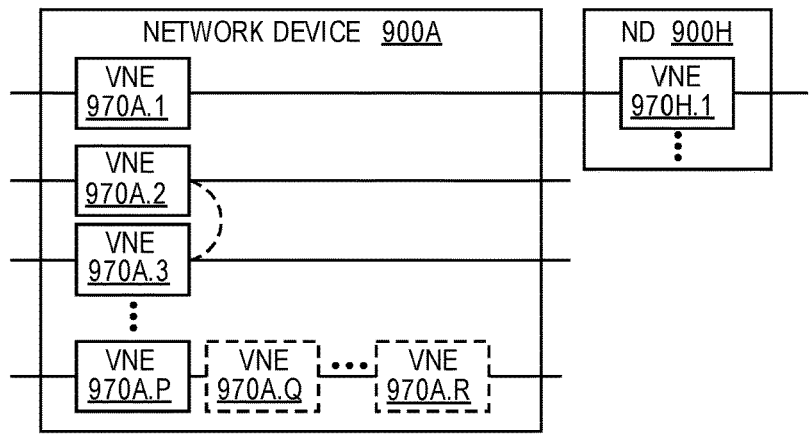
FIG. 9C illustrates various exemplary ways in which virtual network elements (VNEs) may be coupled according to some embodiments of the invention.

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user equipment including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user equipment (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user equipment may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software instances 962A-R may operate as servers; the same would be true for the hybrid network device 906; in the case of the special-purpose network device 902, one or more such servers could also be run on a virtualization layer executed by the processor(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 9D:
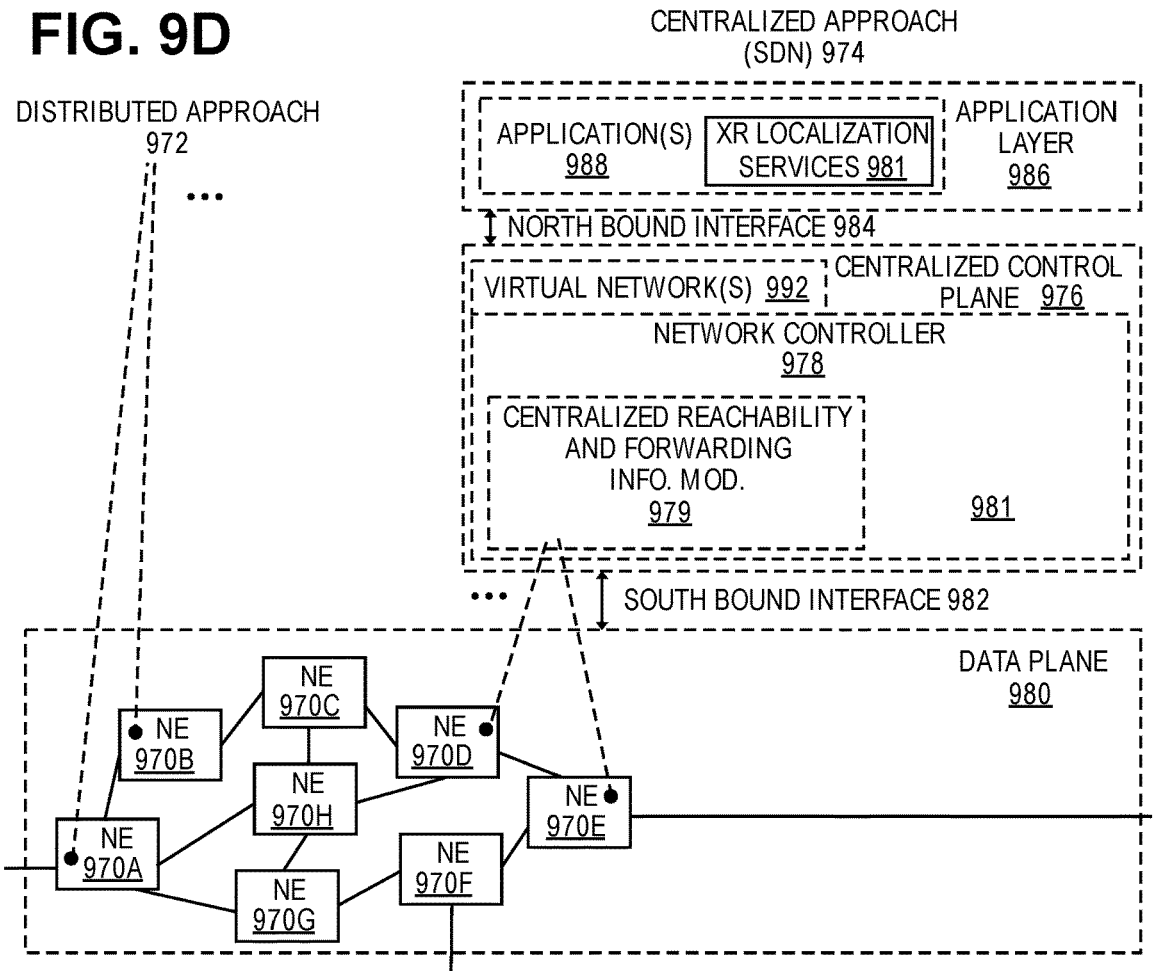
FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments of the invention. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 970A-H (e.g., the processor(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs.

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the processor(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal). In some embodiments, the applications 988 or other components of the centralized approach 974 can encompass elements and functions of the XR localization services 981 to be executed by the centralized SDN approach 974 according to the embodiments described herein.

While FIG. 9D shows the distributed approach 972 separate from the centralized approach 974, the effort of network control may be distributed differently or the two combined in certain embodiments of the invention. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 974 but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively, or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
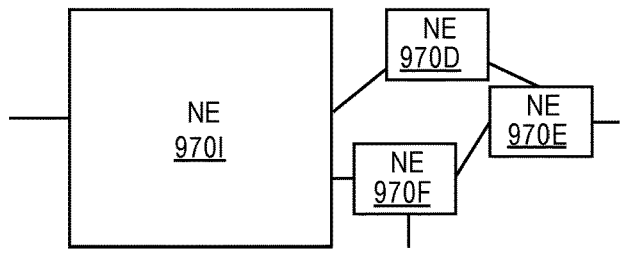
FIG. 9E illustrates the simple case of where each of the NDs implements a single NE, but a centralized control plane has abstracted multiple of the NEs in different NDs into (to represent) a single NE in one of the virtual network(s), according to some embodiments of the invention.
Figure 9F:
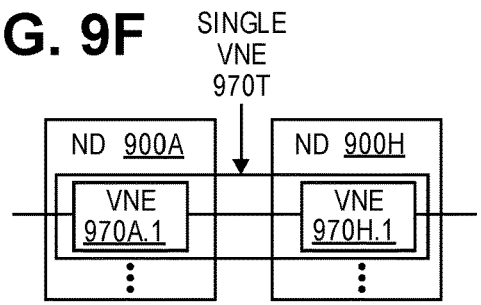
FIG. 9F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments of the invention. FIG. 9E shows that in this virtual network, the NE 9701 is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
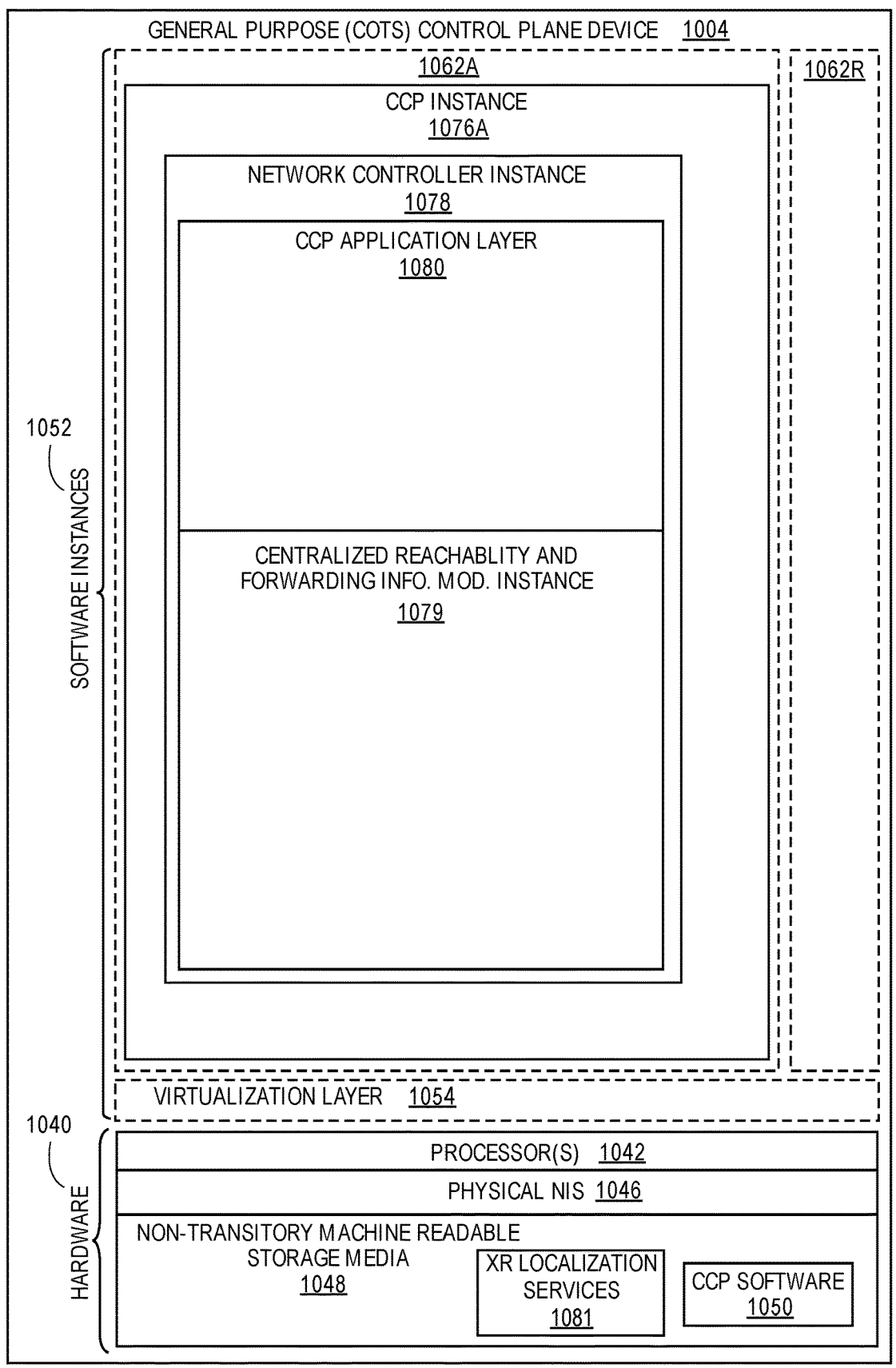
FIG. 10 illustrates a general purpose control plane device with centralized control plane (CCP) software 1050, according to some embodiments of the invention.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and physical NIs 1046, as well as non-transitory machine readable storage media 1048 having stored therein centralized control plane (CCP) software 1050. In some embodiments, the software stored in the storage media 1048 can encompass elements and functions of the XR localization services 1081 to be executed by the control plane device 1004 according to the embodiments described herein.

In embodiments that use compute virtualization, the processor(s) 1042 typically execute software to instantiate a virtualization layer 1054 (e.g., in one embodiment the virtualization layer 1054 represents the kernel of an operating system (or a shim executing on a base operating system) that allows for the creation of multiple instances 1062A-R called software containers (representing separate user spaces and also called virtualization engines, virtual private servers, or jails) that may each be used to execute a set of one or more applications; in another embodiment the virtualization layer 1054 represents a hypervisor (sometimes referred to as a virtual machine monitor (VMM)) or a hypervisor executing on top of a host operating system, and an application is run on top of a guest operating system within an instance 1062A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1040, directly on a hypervisor represented by virtualization layer 1054 (in which case the unikernel is sometimes described as running within a LibOS virtual machine), or in a software container represented by one of instances 1062A-R). Again, in embodiments where compute virtualization is used, during operation an instance of the CCP software 1050 (illustrated as CCP instance 1076A) is executed (e.g., within the instance 1062A) on the virtualization layer 1054. In embodiments where compute virtualization is not used, the CCP instance 1076A is executed, as a unikernel or on top of a host operating system, on the "bare metal" general purpose control plane device 1004. The instantiation of the CCP instance 1076A, as well as the virtualization layer 1054 and instances 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user-interfaces). At a more abstract level, this CCP application layer 1080 within the centralized control plane 976 works with virtual network view(s) (logical view(s) of the network) and the middleware layer provides the conversion from the virtual networks to the physical view.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of an electronic device in an edge cloud of a mobile network to support extended reality localization of an object having a location in a real world where the location of the object is stored as location information in a database associated with the edge cloud in the mobile network, the method comprising:
receiving a first request from an application of a user equipment for matchmaking to pair with the object;
retrieving an object identifier corresponding to the object;
sending the object identifier to the application;
receiving a second request from the application, the second request for requesting the location information of the object, the second request including the object identifier;
retrieving the location information from the database using the object identifier;
returning the location information to the application at the user equipment;
determining whether time delimited retention requirements for the object identifier for the application have expired; and
deleting the location information and the object identifier for the application in response to determining the time delimited retention requirements have expired.

2. The method of claim 1, further comprising:
recording parameters of the requests in the database or at the edge cloud.

3. The method of claim 1, further comprising:
receiving a location information update from an object registered with an extended reality localization service;
associating the location information with a unique identifier that identifies a spatial location in mapping of the real world; and
storing the unique identifier in a database entry for the object identifier.

4. A method of an electronic device associated with an edge cloud of a mobile network to participate in an extended reality localization of an object associated with an application of a user equipment, the object having a location in a real world, the method comprising:
generating a unique object identifier corresponding to the object;
determining location information for the object;
sending the object identifier to the edge cloud to send to the application, when the edge cloud receives a first request from the application for matchmaking to pair with the object;
sending the location information of the object to the edge cloud to send to the application, when the edge cloud receives a second request from the application to request the location information of the object where the second request includes the object identifier; and
deleting the location information and the object identifier for the application in response to determining that retention requirements for the object identifier for the application have expired.

5. The method of claim 4, further comprising:
establishing a connection with the edge cloud.

6. The method of claim 4, further comprising:
determining that an update triggering event has occurred; and
reporting updated location information for the object to the edge cloud in response to determining the update triggering event occurred.

7. The method of claim 4, wherein the object identifier encodes a manufacturer or owner of the object, a type of the object, and a time limit for retention of the object identifier.

8. An electronic device in an edge cloud of a mobile network to support extended reality localization of an object having a location in a real world where the location of the object is stored as location information in a database associated with the edge cloud in the mobile network, the electronic device comprising:
a non-transitory machine-readable storage medium having stored therein an extended reality localization service; and a processor coupled to the non-transitory machine-readable storage medium, the processor to execute the extended reality localization service, the extended reality localization service to receive a first request from an application of a user equipment for matchmaking to pair with the object, to retrieve an object identifier corresponding to the object, to send the object identifier to the application, to receive a second request from the application, the second request for requesting the location information of the object, the second request including the object identifier, to retrieve the location information from the database using the object identifier, to return the location information to the application at the user equipment, to determine whether time delimited retention requirements for the object identifier—for the application have expired, and to delete the location information and the object identifier for the application in response to determining the time delimited retention requirements have expired.

9. The electronic device of claim 8, wherein the extended reality localization service is further to record parameters of the requests in the database or at the edge cloud.

10. The electronic device of claim 8, wherein the extended reality localization service is further to receive a location information update from an object registered with an extended reality localization service, associate the location information with a unique identifier that identifies a spatial location in mapping of the real world, and store the unique identifier in a database entry for the object identifier.

11. An electronic device associated with an edge cloud of a mobile network to participate in an extended reality localization of an object associated with an application of a user equipment, the object having a location in a real world, the electronic device comprising: a non-transitory machine-readable storage medium having stored therein a localization service; and a processor coupled to the non-transitory machine-readable storage medium, the processor to execute the localization service, the localization service to generate a unique object identifier corresponding to the object, to determine location information for the object, to send the object identifier to the edge cloud to send to the application when the edge cloud receives a first request from the application for matchmaking to pair with the object, to send the location information of the object to the edge cloud to send to the application when the edge cloud receives a second request from the application to request the location information of the object where the second request includes the object identifier and to delete the location information and the object identifier for the application in response to a determination that retention requirements for the object identifier for the application have expired.

12. The electronic device of claim 11, wherein the localization service is further to establishing a connection with the edge cloud.

13. The electronic device of claim 11, wherein the localization service is further to determine that an update triggering event has occurred, and reporting updated location information for the object to the edge cloud in response to determining the update triggering event occurred.

14. The electronic device of claim 11, wherein the object identifier encodes a manufacturer or owner of the object, a type of the object, and a time limit for retention of the object identifier.

\* \* \* \* \*